(12) United States Patent
Jung et al.

(10) Patent No.: US 9,942,511 B2
(45) Date of Patent: Apr. 10, 2018

(54) PRESERVATION/DEGRADATION OF VIDEO/AUDIO ASPECTS OF A DATA STREAM

(71) Applicant: SEARETE LLC, Bellevue, WA (US)

(72) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 279 days.

(21) Appl. No.: 14/458,213

(22) Filed: Aug. 12, 2014

(65) Prior Publication Data

US 2015/0070582 A1    Mar. 12, 2015

Related U.S. Application Data

(63) Continuation-in-part of application No. 13/134,744, filed on Jun. 15, 2011, now Pat. No. 8,804,033, which
(Continued)

(51) Int. Cl.
*H04N 7/01* (2006.01)
*H04N 1/00* (2006.01)
(Continued)

(52) U.S. Cl.
CPC ....... *H04N 7/0117* (2013.01); *H04N 1/00137* (2013.01); *H04N 1/00148* (2013.01); *H04N 1/00954* (2013.01); *H04N 1/2112* (2013.01); *H04N 5/4401* (2013.01); *H04N 5/76* (2013.01); *H04N 7/163* (2013.01); *H04N 9/7921* (2013.01); *H04N 21/4223* (2013.01); *H04N 21/4334* (2013.01); *H04N 21/4335* (2013.01); *H04N 21/4402* (2013.01); *H04N 21/478* (2013.01); *H04N 21/488* (2013.01);
(Continued)

(58) Field of Classification Search
CPC ............. H04N 2201/0084; H04N 1/42; H04N 2201/3274; H04N 5/4401; G06F 17/3028; G08B 13/19667
See application file for complete search history.

(56) References Cited

U.S. PATENT DOCUMENTS

| 4,124,871 A | 11/1978 | Morrin, II |
| 4,249,218 A | 2/1981 | Davis et al. |

(Continued)

FOREIGN PATENT DOCUMENTS

| EP | 0940711 | 11/2003 |
| JP | 5064225 | 3/1993 |

(Continued)

OTHER PUBLICATIONS

U.S. Appl. No. 11/048,629, Jung et al.
(Continued)

*Primary Examiner* — Amy Hsu

(57) ABSTRACT

In one aspect, a method related to data management. In addition, other method, system, and program product aspects are described in the claims, drawings, and/or text forming a part of the present application.

20 Claims, 9 Drawing Sheets

Related U.S. Application Data is a continuation-in-part of application No. 11/455,001, filed on Jun. 16, 2006, now Pat. No. 9,167,195, which is a continuation-in-part of application No. 11/441,785, filed on May 26, 2006, now Pat. No. 8,233,042, which is a continuation-in-part of application No. 11/434,568, filed on May 15, 2006, which is a continuation-in-part of application No. 11/413,271, filed on Apr. 28, 2006, now abandoned, which is a continuation-in-part of application No. 11/396,279, filed on Mar. 31, 2006, now abandoned, which is a continuation-in-part of application No. 11/376,627, filed on Mar. 15, 2006, now abandoned, which is a continuation-in-part of application No. 11/364,496, filed on Feb. 28, 2006, now Pat. No. 9,076,208, which is a continuation-in-part of application No. 11/264,701, filed on Nov. 1, 2005, now Pat. No. 9,191,611, which is a continuation-in-part of application No. 11/263,587, filed on Oct. 31, 2005, now Pat. No. 7,872,675.

(51) Int. Cl.
| | | |
|---|---|---|
| *H04N 1/21* | (2006.01) | |
| *H04N 5/76* | (2006.01) | |
| *H04N 7/16* | (2011.01) | |
| *H04N 9/79* | (2006.01) | |
| *H04N 21/4223* | (2011.01) | |
| *H04N 21/433* | (2011.01) | |
| *H04N 21/4335* | (2011.01) | |
| *H04N 21/4402* | (2011.01) | |
| *H04N 21/485* | (2011.01) | |
| *H04N 21/6377* | (2011.01) | |
| *H04N 21/658* | (2011.01) | |
| *H04N 5/44* | (2011.01) | |
| *H04N 21/478* | (2011.01) | |
| *H04N 21/488* | (2011.01) | |
| *G08B 13/196* | (2006.01) | |
| *H04N 1/32* | (2006.01) | |
| *H04N 101/00* | (2006.01) | |

(52) U.S. Cl.
CPC ..... *H04N 21/4854* (2013.01); *H04N 21/6377* (2013.01); *H04N 21/658* (2013.01); *G08B 13/19667* (2013.01); *H04N 1/32101* (2013.01); *H04N 2101/00* (2013.01); *H04N 2201/0084* (2013.01); *H04N 2201/0087* (2013.01); *H04N 2201/212* (2013.01); *H04N 2201/214* (2013.01); *H04N 2201/3225* (2013.01); *H04N 2201/3274* (2013.01); *H04N 2201/33328* (2013.01); *H04N 2201/33357* (2013.01); *H04N 2201/33378* (2013.01)

(56) References Cited

U.S. PATENT DOCUMENTS

| | | |
|---|---|---|
| 4,567,884 A | 2/1986 | Edwards |
| 4,763,146 A | 8/1988 | Niikura |
| 4,788,565 A | 11/1988 | Masuda et al. |
| 4,829,384 A | 5/1989 | Iida et al. |
| 4,862,280 A | 8/1989 | Iida et al. |
| 4,887,596 A | 12/1989 | Sherman |
| 5,001,504 A | 3/1991 | Okada |
| 5,034,759 A | 7/1991 | Watson |
| 5,150,215 A | 9/1992 | Shi |
| 5,164,831 A | 11/1992 | Kuchta et al. |
| 5,306,275 A | 4/1994 | Bryan |
| 5,341,192 A | 8/1994 | Wally, Jr. et al. |
| 5,368,594 A | 11/1994 | Martin et al. |
| 5,388,197 A | 2/1995 | Rayner |
| 5,410,343 A | 4/1995 | Coddington et al. |
| 5,444,476 A | 8/1995 | Conway |
| 5,467,288 A | 11/1995 | Faciano et al. |
| 5,485,553 A | 1/1996 | Kovalick et al. |
| 5,485,554 A | 1/1996 | Lowitz et al. |
| 5,522,817 A | 6/1996 | Sender et al. |
| 5,546,145 A | 8/1996 | Bernardi et al. |
| 5,561,883 A | 10/1996 | Landry et al. |
| 5,588,029 A | 12/1996 | Maturi et al. |
| 5,612,715 A | 3/1997 | Karaki et al. |
| 5,629,778 A | 5/1997 | Reuman |
| 5,633,678 A | 5/1997 | Parulski et al. |
| 5,643,260 A | 7/1997 | Doherty |
| 5,655,144 A | 8/1997 | Milne et al. |
| 5,658,284 A | 8/1997 | Sebastian et al. |
| 5,659,662 A | 8/1997 | Wilcox et al. |
| 5,675,789 A | 10/1997 | Ishii et al. |
| 5,689,343 A | 11/1997 | Loce et al. |
| 5,689,442 A | 11/1997 | Swanson et al. |
| 5,701,163 A | 12/1997 | Richards et al. |
| 5,715,487 A | 2/1998 | McIntyre et al. |
| 5,738,522 A | 4/1998 | Sussholtz et al. |
| 5,751,338 A | 5/1998 | Ludwig |
| 5,764,800 A | 6/1998 | Yamagata |
| 5,793,630 A | 8/1998 | Theimer et al. |
| 5,796,879 A | 8/1998 | Wong et al. |
| 5,809,161 A | 9/1998 | Auty et al. |
| 5,818,977 A | 10/1998 | Tansley |
| 5,825,506 A | 10/1998 | Bednar et al. |
| 5,825,753 A | 10/1998 | Betts et al. |
| 5,867,614 A | 2/1999 | Ito |
| 5,889,895 A | 3/1999 | Wong et al. |
| 5,892,509 A | 4/1999 | Jakobs et al. |
| 5,915,135 A | 6/1999 | Fiorentini |
| 5,917,958 A | 6/1999 | Nunally et al. |
| 5,917,962 A | 6/1999 | Chen et al. |
| 5,926,605 A | 7/1999 | Ichimura |
| 5,928,230 A | 7/1999 | Tosic |
| 5,938,663 A | 8/1999 | Petreto |
| 5,944,720 A | 8/1999 | Lipton |
| 5,949,484 A | 9/1999 | Nakaya et al. |
| 5,956,081 A | 9/1999 | Katz et al. |
| 5,959,622 A | 9/1999 | Greer et al. |
| 5,977,867 A | 11/1999 | Blouin |
| 5,995,095 A | 11/1999 | Ratakonda |
| 6,010,501 A | 1/2000 | Raskin et al. |
| 6,011,901 A | 1/2000 | Kirsten |
| 6,021,403 A | 2/2000 | Horvitz et al. |
| 6,028,585 A | 2/2000 | Ishii et al. |
| 6,034,786 A | 3/2000 | Kwon |
| 6,046,762 A | 4/2000 | Sonesh et al. |
| 6,107,918 A | 8/2000 | Klein et al. |
| 6,115,341 A | 9/2000 | Hirai |
| 6,122,003 A | 9/2000 | Anderson |
| 6,122,411 A | 9/2000 | Shen et al. |
| 6,134,345 A | 10/2000 | Berman et al. |
| 6,136,000 A | 10/2000 | Louis et al. |
| 6,136,002 A | 10/2000 | Shih et al. |
| 6,157,406 A | 12/2000 | Iura et al. |
| 6,157,935 A | 12/2000 | Tran et al. |
| 6,167,350 A | 12/2000 | Hiramatsu et al. |
| 6,167,469 A | 12/2000 | Safai et al. |
| 6,177,958 B1 | 1/2001 | Anderson |
| 6,188,383 B1 | 2/2001 | Tamura |
| 6,198,526 B1 | 3/2001 | Ohtsuka |
| 6,222,465 B1 | 4/2001 | Kumar et al. |
| 6,229,565 B1 | 5/2001 | Bobry |
| 6,229,850 B1 | 5/2001 | Linzer et al. |
| 6,275,260 B1 | 8/2001 | Anderson |
| 6,282,377 B1 | 8/2001 | Lawther et al. |
| 6,285,794 B1 | 9/2001 | Georgiev et al. |
| 6,332,666 B1 | 12/2001 | Ikeda |
| 6,333,792 B1 | 12/2001 | Kimura |
| 6,359,649 B1 | 3/2002 | Suzuki |
| 6,366,577 B1 | 4/2002 | Donovan |
| 6,368,320 B1 | 4/2002 | Le Couedic et al. |
| 6,380,972 B1 | 4/2002 | Suga et al. |
| 6,384,862 B1 | 5/2002 | Brusewitz et al. |

(56) References Cited

U.S. PATENT DOCUMENTS

| | | |
|---|---|---|
| 6,400,848 B1 | 6/2002 | Gallagher |
| 6,411,742 B1 | 6/2002 | Peterson |
| 6,413,258 B1 | 7/2002 | Bernhardt |
| 6,437,797 B1 | 8/2002 | Ota |
| 6,445,822 B1 | 9/2002 | Crill et al. |
| 6,446,095 B1 | 9/2002 | Mukai |
| 6,452,974 B1 | 9/2002 | Menon et al. |
| 6,456,339 B1 | 9/2002 | Surati et al. |
| 6,476,858 B1 | 11/2002 | Ramiraz Diaz |
| 6,493,028 B1 | 12/2002 | Anderson et al. |
| 6,499,016 B1 | 12/2002 | Anderson |
| 6,509,931 B1 | 1/2003 | Mizosoe et al. |
| 6,512,541 B2 | 1/2003 | Dunton et al. |
| 6,577,336 B2 | 1/2003 | Safai |
| 6,516,154 B1 | 2/2003 | Parulski et al. |
| 6,519,612 B1 | 2/2003 | Howard et al. |
| 6,522,418 B2 | 2/2003 | Yokomizo et al. |
| 6,527,772 B2 | 3/2003 | Enayati |
| 6,535,228 B1 | 3/2003 | Bandaru et al. |
| 6,536,982 B2 | 3/2003 | Gibbons et al. |
| 6,539,169 B1 | 3/2003 | Tsubaki et al. |
| 6,542,183 B1 | 4/2003 | DeAngelis et al. |
| 6,546,189 B1 | 4/2003 | Koda |
| 6,567,122 B1 | 5/2003 | Anderson et al. |
| 6,569,164 B1 | 5/2003 | Assaker et al. |
| 6,573,927 B2 | 6/2003 | Parulski et al. |
| 6,575,480 B2 | 6/2003 | McKelvey |
| 6,577,311 B1 | 6/2003 | Crosby et al. |
| 6,587,602 B2 | 7/2003 | Wakisawa et al. |
| 6,611,293 B2 | 8/2003 | Tarnoff et al. |
| 6,629,104 B1 | 9/2003 | Parulski et al. |
| 6,633,309 B2 | 10/2003 | Lau et al. |
| 6,646,676 B1 | 11/2003 | DaGraca et al. |
| 6,650,366 B2 | 11/2003 | Parulski et al. |
| 6,650,704 B1 | 11/2003 | Carson et al. |
| 6,654,543 B2 | 11/2003 | Ando et al. |
| 6,657,667 B1 | 12/2003 | Anderson |
| 6,663,631 B2 | 12/2003 | Kuntz |
| 6,671,737 B1 | 12/2003 | Snowdon et al. |
| 6,678,413 B1 | 1/2004 | Liang et al. |
| 6,680,748 B1 | 1/2004 | Monti |
| 6,687,877 B1 | 2/2004 | Sastry et al. |
| 6,698,021 B1 | 2/2004 | Amini et al. |
| 6,701,845 B2 | 3/2004 | Ohmura |
| 6,710,809 B1 | 3/2004 | Niikawa |
| 6,714,192 B1 | 3/2004 | Torres |
| 6,734,911 B1 | 5/2004 | Lyons |
| 6,735,253 B1 | 5/2004 | Chang et al. |
| 6,738,155 B1 | 5/2004 | Rosenlund et al. |
| 6,741,864 B2 | 5/2004 | Wilcock et al. |
| 6,749,612 B1 | 6/2004 | Conchy et al. |
| 6,750,902 B1 | 6/2004 | Steinberg |
| 6,757,008 B1 | 6/2004 | Smith |
| 6,757,431 B2 | 6/2004 | Loce et al. |
| 6,762,791 B1 | 7/2004 | Schuetzle |
| 6,766,036 B1 | 7/2004 | Pryor |
| 6,801,719 B1 | 10/2004 | Szajewski et al. |
| 6,813,312 B2 | 11/2004 | Tullberg et al. |
| 6,816,071 B2 | 11/2004 | Conti |
| 6,822,660 B2 | 11/2004 | Kim |
| 6,823,092 B1 | 11/2004 | Sato |
| 6,832,009 B1 | 12/2004 | Shezaf et al. |
| 6,871,010 B1 | 3/2005 | Taguchi et al. |
| 6,879,731 B2 | 4/2005 | Kang et al. |
| 6,885,395 B1 | 4/2005 | Rabbani et al. |
| 6,898,173 B2 | 5/2005 | McPherson et al. |
| 6,903,763 B1 | 6/2005 | Noguchi et al. |
| 6,918,911 B2 | 7/2005 | Biedermann et al. |
| 6,928,230 B2 | 8/2005 | Squibbs |
| 6,930,707 B2 | 8/2005 | Bates et al. |
| 6,947,075 B1 | 9/2005 | Niikawa |
| 6,954,224 B1 | 10/2005 | Okada et al. |
| 6,961,083 B2 | 11/2005 | Obrador et al. |
| 6,961,087 B1 | 11/2005 | Yoshida |
| 6,967,780 B2 | 11/2005 | Hillis et al. |
| 6,978,047 B2 | 12/2005 | Montgomery |
| 6,987,528 B1 | 1/2006 | Nagahisa et al. |
| 6,999,626 B2 | 2/2006 | Andrew |
| 7,015,949 B1 | 3/2006 | Sah |
| 7,015,954 B1 | 3/2006 | Foote et al. |
| 7,023,469 B1 | 4/2006 | Olson |
| 7,046,273 B2 | 5/2006 | Suzuki |
| 7,046,292 B2 | 5/2006 | Ziemkowski |
| 7,068,316 B1 | 6/2006 | Pine |
| 7,075,567 B2 | 7/2006 | Hunter et al. |
| 7,079,176 B1 | 7/2006 | Freeman et al. |
| 7,084,910 B2 | 8/2006 | Amerson et al. |
| 7,110,025 B1 | 9/2006 | Loui et al. |
| 7,110,027 B2 * | 9/2006 | Wyman ............... H04N 5/772 348/220.1 |
| 7,141,051 B2 | 11/2006 | Janowski et al. |
| 7,175,622 B2 | 2/2007 | Farris |
| 7,196,317 B1 | 3/2007 | Meissner, II et al. |
| 7,203,648 B1 | 4/2007 | Ostermann et al. |
| 7,213,766 B2 | 5/2007 | Ryan et al. |
| 7,218,792 B2 | 5/2007 | Raskar et al. |
| 7,219,365 B2 | 5/2007 | Sato et al. |
| 7,221,863 B2 | 5/2007 | Kondo et al. |
| 7,227,569 B2 | 6/2007 | Maruya |
| 7,236,360 B2 | 6/2007 | Schmid |
| 7,236,690 B2 | 6/2007 | Matsukawa |
| 7,257,317 B2 | 8/2007 | Ohnishi |
| 7,287,088 B1 | 10/2007 | Anderson |
| 7,292,229 B2 | 11/2007 | Morag et al. |
| 7,327,387 B2 | 2/2008 | Tanaka et al. |
| 7,333,134 B2 | 2/2008 | Miyamoto |
| 7,339,623 B2 | 3/2008 | Kawai |
| 7,340,766 B2 | 3/2008 | Nagao et al. |
| 7,344,537 B1 | 3/2008 | Mueller |
| 7,362,968 B2 | 4/2008 | Kim |
| 7,366,979 B2 | 4/2008 | Spielberg et al. |
| 7,379,116 B2 | 5/2008 | Okamura |
| 7,383,508 B2 | 6/2008 | Toyama et al. |
| 7,411,623 B2 | 8/2008 | Shibutani |
| 7,417,667 B2 | 8/2008 | Shibutani |
| 7,444,593 B1 | 10/2008 | Reid |
| 7,448,063 B2 | 11/2008 | Freeman et al. |
| 7,460,495 B2 | 12/2008 | Li |
| 7,504,942 B2 | 3/2009 | Marman |
| 7,529,411 B2 | 5/2009 | Haupt et al. |
| 7,535,491 B1 | 5/2009 | Kumagai et al. |
| 7,551,787 B2 | 6/2009 | Marks |
| 7,576,770 B2 | 8/2009 | Metzger et al. |
| 7,587,674 B2 | 9/2009 | Broeksteeg |
| 7,612,804 B1 | 11/2009 | Marcu et al. |
| 7,612,806 B2 | 11/2009 | Kazami et al. |
| 7,626,614 B1 | 12/2009 | Marcu et al. |
| 7,626,733 B2 | 12/2009 | Kodama et al. |
| 7,647,614 B2 | 1/2010 | Krikorian et al. |
| 7,650,058 B1 | 1/2010 | Garoutte |
| 7,733,371 B1 | 6/2010 | Monroe |
| 7,751,628 B1 | 7/2010 | Reisman |
| 7,782,365 B2 | 8/2010 | Levien et al. |
| 7,860,319 B2 | 12/2010 | Obrador et al. |
| 7,872,675 B2 | 1/2011 | Levien et al. |
| 7,876,357 B2 | 1/2011 | Jung et al. |
| 7,904,814 B2 | 3/2011 | Errico et al. |
| 7,924,324 B2 | 4/2011 | Fujita |
| 8,026,944 B1 | 9/2011 | Sah |
| 8,072,501 B2 | 12/2011 | Jung et al. |
| 8,253,821 B2 | 8/2012 | Jung et al. |
| 8,350,946 B2 | 1/2013 | Jung et al. |
| 9,019,383 B2 | 4/2015 | Jung et al. |
| 2001/0015756 A1 | 8/2001 | Wilcock et al. |
| 2001/0019841 A1 | 9/2001 | Usala et al. |
| 2001/0028398 A1 | 10/2001 | Takahashi |
| 2001/0029521 A1 | 10/2001 | Matsuda et al. |
| 2001/0030709 A1 | 10/2001 | Tarnoff et al. |
| 2001/0031005 A1 | 10/2001 | Nister et al. |
| 2001/0033333 A1 | 10/2001 | Suzuki et al. |
| 2001/0042043 A1 | 11/2001 | Shear et al. |
| 2001/0046199 A1 | 11/2001 | McPherson et al. |
| 2001/0050875 A1 | 12/2001 | Kahn et al. |
| 2001/0051863 A1 | 12/2001 | Razavi et al. |

(56) References Cited

U.S. PATENT DOCUMENTS

| | | |
|---|---|---|
| 2002/0012071 A1 | 1/2002 | Sun |
| 2002/0015094 A1 | 2/2002 | Kuwano et al. |
| 2002/0023188 A1 | 2/2002 | Heidel et al. |
| 2002/0028026 A1 | 3/2002 | Chen et al. |
| 2002/0028060 A1 | 3/2002 | Murata et al. |
| 2002/0030749 A1 | 3/2002 | Nakamura et al. |
| 2002/0054232 A1 | 5/2002 | Inagaki |
| 2002/0069036 A1 | 6/2002 | Mizokawa |
| 2002/0072982 A1 | 6/2002 | Barton et al. |
| 2002/0090217 A1 | 7/2002 | Limor et al. |
| 2002/0144273 A1 | 10/2002 | Reto |
| 2002/0145622 A1 | 10/2002 | Kauffman et al. |
| 2002/0149677 A1 | 10/2002 | Wright |
| 2002/0154221 A1 | 10/2002 | Ishimaru |
| 2002/0171737 A1 | 11/2002 | Tullis |
| 2002/0171747 A1 | 11/2002 | Niikawa et al. |
| 2002/0176016 A1 | 11/2002 | Misawa et al. |
| 2002/0176508 A1 | 11/2002 | Boyce et al. |
| 2002/0186668 A1 | 12/2002 | Thomason |
| 2002/0191952 A1 | 12/2002 | Fiore et al. |
| 2002/0196344 A1 | 12/2002 | McIntyre et al. |
| 2002/0197067 A1 | 12/2002 | Ohnishi |
| 2003/0007078 A1* | 1/2003 | Feldis, III ............ G11B 27/105 348/231.6 |
| 2003/0012261 A1 | 1/2003 | Toda |
| 2003/0012354 A1 | 1/2003 | Patterson |
| 2003/0013014 A1 | 1/2003 | Ashihara et al. |
| 2003/0017505 A1 | 1/2003 | Mathur et al. |
| 2003/0017642 A1 | 1/2003 | Conti et al. |
| 2003/0018802 A1 | 1/2003 | Romanik et al. |
| 2003/0020811 A1 | 1/2003 | Hunter et al. |
| 2003/0020814 A1 | 1/2003 | Ono |
| 2003/0021455 A1 | 1/2003 | Dixon et al. |
| 2003/0026232 A1 | 2/2003 | Uskela |
| 2003/0026596 A1 | 2/2003 | Betti et al. |
| 2003/0037111 A1 | 2/2003 | Yoshioka |
| 2003/0045874 A1 | 3/2003 | Thomas, Jr. |
| 2003/0058265 A1 | 3/2003 | Robinson et al. |
| 2003/0063114 A1 | 4/2003 | Nishida |
| 2003/0063211 A1 | 4/2003 | Watanabe et al. |
| 2003/0069898 A1 | 4/2003 | Christodoulou et al. |
| 2003/0070174 A1 | 4/2003 | Solomon |
| 2003/0072491 A1 | 4/2003 | Sirivara et al. |
| 2003/0080878 A1 | 5/2003 | Kirmuss |
| 2003/0081140 A1 | 5/2003 | Furukawa |
| 2003/0090690 A1 | 5/2003 | Katayama et al. |
| 2003/0095191 A1 | 5/2003 | Saito |
| 2003/0103144 A1 | 6/2003 | Sesek et al. |
| 2003/0103670 A1 | 6/2003 | Schoelkopf et al. |
| 2003/0120784 A1 | 6/2003 | Johnson et al. |
| 2003/0131002 A1 | 7/2003 | Gennetten et al. |
| 2003/0151679 A1 | 8/2003 | Amerson et al. |
| 2003/0152263 A1 | 8/2003 | Kawano et al. |
| 2003/0158958 A1 | 8/2003 | Chiu |
| 2003/0160870 A1 | 8/2003 | Ziemkowski |
| 2003/0162556 A1 | 8/2003 | Libes |
| 2003/0169367 A1 | 9/2003 | Ranta |
| 2003/0171752 A1 | 9/2003 | Assaker et al. |
| 2003/0189654 A1 | 10/2003 | Kage et al. |
| 2003/0218685 A1 | 11/2003 | Kawai |
| 2003/0222998 A1 | 12/2003 | Yamauchi et al. |
| 2003/0227560 A1 | 12/2003 | Mattsson et al. |
| 2003/0229894 A1 | 12/2003 | Okada et al. |
| 2003/0234953 A1 | 12/2003 | Dawson et al. |
| 2003/0236674 A1 | 12/2003 | Henry, Jr. |
| 2003/0236831 A1 | 12/2003 | Ortiz et al. |
| 2003/0236832 A1 | 12/2003 | McIntyre et al. |
| 2004/0001145 A1 | 1/2004 | Abbate |
| 2004/0001161 A1 | 1/2004 | Herley |
| 2004/0017333 A1 | 1/2004 | Cooper et al. |
| 2004/0032517 A1 | 2/2004 | Walmsley et al. |
| 2004/0037442 A1 | 2/2004 | Nielsen et al. |
| 2004/0037540 A1 | 2/2004 | Frohlich et al. |
| 2004/0042679 A1 | 3/2004 | Yamada |
| 2004/0046885 A1 | 3/2004 | Regan et al. |
| 2004/0054371 A1 | 3/2004 | Dierks et al. |
| 2004/0056960 A1 | 3/2004 | Hayashi |
| 2004/0066968 A1 | 4/2004 | Glickman |
| 2004/0070586 A1 | 4/2004 | Taubin |
| 2004/0070678 A1 | 4/2004 | Toyama et al. |
| 2004/0071445 A1 | 4/2004 | Tarnoff et al. |
| 2004/0075750 A1* | 4/2004 | Bateman ................ H04N 5/907 348/231.1 |
| 2004/0080537 A1 | 4/2004 | Adler |
| 2004/0085456 A1 | 5/2004 | Kwag et al. |
| 2004/0090526 A1 | 5/2004 | Watanabe et al. |
| 2004/0092311 A1 | 5/2004 | Weston et al. |
| 2004/0095474 A1 | 5/2004 | Matsufune |
| 2004/0108995 A1 | 6/2004 | Hoshino et al. |
| 2004/0111088 A1 | 6/2004 | Picetti et al. |
| 2004/0119733 A1 | 6/2004 | Morimoto et al. |
| 2004/0120562 A1 | 6/2004 | Hays et al. |
| 2004/0123131 A1 | 6/2004 | Zacks et al. |
| 2004/0130634 A1 | 7/2004 | Delaney et al. |
| 2004/0131282 A1 | 7/2004 | Yoshida et al. |
| 2004/0141056 A1 | 7/2004 | Izumi et al. |
| 2004/0145501 A1 | 7/2004 | Hung |
| 2004/0145657 A1 | 7/2004 | Yamamoto et al. |
| 2004/0150641 A1 | 8/2004 | Duiker |
| 2004/0150724 A1 | 8/2004 | Nozaki et al. |
| 2004/0160453 A1 | 8/2004 | Horton et al. |
| 2004/0166930 A1 | 8/2004 | Beaulieu et al. |
| 2004/0171381 A1 | 9/2004 | Inselberg |
| 2004/0174434 A1 | 9/2004 | Walker et al. |
| 2004/0174454 A1 | 9/2004 | Okamura |
| 2004/0179121 A1 | 9/2004 | Silverstein |
| 2004/0179545 A1 | 9/2004 | Erola et al. |
| 2004/0183903 A1 | 9/2004 | Pedersen |
| 2004/0186473 A1 | 9/2004 | Cournoyer et al. |
| 2004/0187583 A1 | 9/2004 | Ogawa |
| 2004/0189856 A1 | 9/2004 | Tanaka |
| 2004/0196399 A1 | 10/2004 | Stavely |
| 2004/0199387 A1 | 10/2004 | Wang et al. |
| 2004/0201690 A1 | 10/2004 | Bryant et al. |
| 2004/0201709 A1 | 10/2004 | McIntyre et al. |
| 2004/0201711 A1 | 10/2004 | Lopaz |
| 2004/0201748 A1 | 10/2004 | Goldstein et al. |
| 2004/0216173 A1 | 10/2004 | Horoszowiski et al. |
| 2004/0218894 A1 | 11/2004 | Harville et al. |
| 2004/0221063 A1 | 11/2004 | Mogul |
| 2004/0229696 A1 | 11/2004 | Beck |
| 2004/0233308 A1 | 11/2004 | Elliot et al. |
| 2004/0239958 A1 | 12/2004 | Nagata et al. |
| 2004/0243419 A1 | 12/2004 | Wang |
| 2004/0252193 A1 | 12/2004 | Higgins |
| 2004/0252230 A1 | 12/2004 | Winder |
| 2004/0254574 A1 | 12/2004 | Morrison et al. |
| 2004/0257462 A1 | 12/2004 | Goris et al. |
| 2004/0263609 A1 | 12/2004 | Otsuki et al. |
| 2004/0263658 A1 | 12/2004 | Cozier et al. |
| 2004/0267259 A1 | 12/2004 | Mazda et al. |
| 2005/0007471 A1 | 1/2005 | Walmsley et al. |
| 2005/0010750 A1 | 1/2005 | Ward et al. |
| 2005/0013602 A1 | 1/2005 | Ogawa |
| 2005/0017068 A1 | 1/2005 | Zalewski et al. |
| 2005/0017947 A1 | 1/2005 | Shahoian et al. |
| 2005/0018053 A1 | 1/2005 | Suga et al. |
| 2005/0028221 A1 | 2/2005 | Liu et al. |
| 2005/0033294 A1 | 2/2005 | Garden et al. |
| 2005/0033991 A1 | 2/2005 | Crane |
| 2005/0036033 A1 | 2/2005 | Imai |
| 2005/0038433 A1 | 2/2005 | Young |
| 2005/0040951 A1 | 2/2005 | Zalewski et al. |
| 2005/0046707 A1 | 3/2005 | Takane |
| 2005/0047676 A1 | 3/2005 | Kang et al. |
| 2005/0050043 A1 | 3/2005 | Pyhalammi et al. |
| 2005/0057687 A1 | 3/2005 | Irani et al. |
| 2005/0058321 A1 | 3/2005 | Buehler |
| 2005/0059972 A1 | 3/2005 | Biscup |
| 2005/0083411 A1 | 4/2005 | Cozier et al. |
| 2005/0084037 A1 | 4/2005 | Liang |
| 2005/0086391 A1 | 4/2005 | Chu et al. |
| 2005/0088417 A1 | 4/2005 | Mulligan |
| 2005/0093980 A1 | 5/2005 | Nonaka et al. |

(56) References Cited

U.S. PATENT DOCUMENTS

| | | |
|---|---|---|
| 2005/0096654 A1 | 5/2005 | Lin |
| 2005/0099519 A1 | 5/2005 | Creamer et al. |
| 2005/0103863 A1 | 5/2005 | Zhu et al. |
| 2005/0105806 A1 | 5/2005 | Nagaoka et al. |
| 2005/0113136 A1 | 5/2005 | Gosieski, Jr. |
| 2005/0130717 A1 | 6/2005 | Gosieski, Jr. et al. |
| 2005/0131905 A1 | 6/2005 | Margolus et al. |
| 2005/0140498 A1 | 6/2005 | Bastian, II |
| 2005/0140803 A1 | 6/2005 | Ohtsuka et al. |
| 2005/0150362 A1 | 7/2005 | Uehara |
| 2005/0158015 A1 | 7/2005 | Nakayama et al. |
| 2005/0162533 A1 | 7/2005 | Noguchi et al. |
| 2005/0169367 A1 | 8/2005 | Venetianer et al. |
| 2005/0171538 A1 | 8/2005 | Sgier et al. |
| 2005/0185062 A1 | 8/2005 | Hillis et al. |
| 2005/0187901 A1 | 8/2005 | Maritzen et al. |
| 2005/0188399 A1 | 8/2005 | Tischer |
| 2005/0192570 A1 | 9/2005 | Jackson |
| 2005/0192572 A1 | 9/2005 | Abdelgany et al. |
| 2005/0193421 A1 | 9/2005 | Cragun |
| 2005/0195285 A1 | 9/2005 | Ide |
| 2005/0197700 A1 | 9/2005 | Boehm, Jr. et al. |
| 2005/0203930 A1 | 9/2005 | Bukowski et al. |
| 2005/0207487 A1 | 9/2005 | Monroe |
| 2005/0210267 A1 | 9/2005 | Sugano et al. |
| 2005/0212912 A1 | 9/2005 | Huster |
| 2005/0212950 A1 | 9/2005 | Kanai |
| 2005/0228375 A1 | 10/2005 | Mazda et al. |
| 2005/0228378 A1 | 10/2005 | Kalfas et al. |
| 2005/0231625 A1 | 10/2005 | Parulski et al. |
| 2005/0232242 A1 | 10/2005 | Karaoguz et al. |
| 2005/0234451 A1 | 10/2005 | Markworth |
| 2005/0240265 A1 | 10/2005 | Kuiper et al. |
| 2005/0243176 A1 | 11/2005 | Wu et al. |
| 2005/0262097 A1 | 11/2005 | Sim-Tang et al. |
| 2005/0271251 A1 | 12/2005 | Russell et al. |
| 2005/0275747 A1 | 12/2005 | Nayer et al. |
| 2005/0277931 A1 | 12/2005 | Sweeney et al. |
| 2006/0008254 A1 | 1/2006 | Seo |
| 2006/0023066 A1 | 2/2006 | Li et al. |
| 2006/0034533 A1 | 2/2006 | Batchvarov |
| 2006/0044398 A1 | 3/2006 | Foong et al. |
| 2006/0044416 A1 | 3/2006 | Miyazaki et al. |
| 2006/0044444 A1 | 3/2006 | Okamoto et al. |
| 2006/0048057 A1 | 3/2006 | Herberger et al. |
| 2006/0050785 A1 | 3/2006 | Watanabe et al. |
| 2006/0056326 A1 | 3/2006 | Croome |
| 2006/0064341 A1 | 3/2006 | Frengut et al. |
| 2006/0072837 A1 | 4/2006 | Ralston et al. |
| 2006/0079892 A1 | 4/2006 | Roychowdhury et al. |
| 2006/0085534 A1 | 4/2006 | Ralston et al. |
| 2006/0087559 A1 | 4/2006 | Huberman et al. |
| 2006/0092291 A1 | 5/2006 | Bodie |
| 2006/0098112 A1 | 5/2006 | Kelly |
| 2006/0104483 A1 | 5/2006 | Harel et al. |
| 2006/0109349 A1 | 5/2006 | Takashima |
| 2006/0119711 A1 | 6/2006 | Ejima et al. |
| 2006/0125922 A1 | 6/2006 | Albert et al. |
| 2006/0143665 A1 | 6/2006 | Meek et al. |
| 2006/0171695 A1 | 8/2006 | Jung et al. |
| 2006/0173756 A1 | 8/2006 | Benight |
| 2006/0174204 A1 | 8/2006 | Jung et al. |
| 2006/0176392 A1 | 8/2006 | Rainier et al. |
| 2006/0177150 A1 | 8/2006 | Uyttendaele et al. |
| 2006/0192887 A1 | 8/2006 | Miyamaki et al. |
| 2006/0195322 A1 | 8/2006 | Broussard et al. |
| 2006/0197839 A1 | 9/2006 | Senior et al. |
| 2006/0203099 A1 | 9/2006 | Omata |
| 2006/0209089 A1 | 9/2006 | Date |
| 2006/0226298 A1 | 10/2006 | Pierson |
| 2006/0262352 A1 | 11/2006 | Hull et al. |
| 2006/0274153 A1 | 12/2006 | Levien et al. |
| 2006/0274154 A1 | 12/2006 | Levien et al. |
| 2006/0274165 A1 | 12/2006 | Levien et al. |
| 2006/0279643 A1 | 12/2006 | Levien et al. |
| 2006/0288273 A1 | 12/2006 | Erol et al. |
| 2007/0008326 A1 | 1/2007 | Levien et al. |
| 2007/0013776 A1 | 1/2007 | Venetianer et al. |
| 2007/0040928 A1 | 2/2007 | Jung et al. |
| 2007/0052856 A1 | 3/2007 | Jung et al. |
| 2007/0097214 A1 | 5/2007 | Jung et al. |
| 2007/0100533 A1 | 5/2007 | Jung et al. |
| 2007/0100606 A1 | 5/2007 | Rogers |
| 2007/0100621 A1 | 5/2007 | Jung et al. |
| 2007/0100860 A1 | 5/2007 | Jung et al. |
| 2007/0106892 A1 | 5/2007 | Engberg |
| 2007/0109411 A1 | 5/2007 | Jung et al. |
| 2007/0120980 A1 | 5/2007 | Jung et al. |
| 2007/0120981 A1 | 5/2007 | Levien et al. |
| 2007/0217761 A1 | 9/2007 | Chen et al. |
| 2007/0222865 A1 | 9/2007 | Levien et al. |
| 2007/0270817 A1 | 11/2007 | Rezach |
| 2007/0274705 A1 | 11/2007 | Kashiwa et al. |
| 2008/0023232 A1 | 1/2008 | Morag et al. |
| 2008/0192129 A1 | 8/2008 | Walker et al. |
| 2008/0298796 A1 | 12/2008 | Kuberka et al. |
| 2008/0303909 A1 | 12/2008 | Wantanabe et al. |
| 2009/0027505 A1 | 1/2009 | Jung et al. |
| 2009/0027546 A1 | 1/2009 | Jung et al. |
| 2009/0073268 A1 | 3/2009 | Jung et al. |
| 2009/0097672 A1 | 4/2009 | Buil et al. |
| 2009/0215388 A1 | 8/2009 | Karaoguz et al. |
| 2010/0017289 A1 | 1/2010 | Sah et al. |
| 2011/0270916 A1 | 11/2011 | Shih et al. |
| 2012/0105716 A1 | 5/2012 | Jung et al. |
| 2014/0195011 A1 | 7/2014 | Sakuta et al. |
| 2014/0282923 A1 | 9/2014 | Narayan et al. |

FOREIGN PATENT DOCUMENTS

| | | |
|---|---|---|
| JP | H09018762 | 1/1997 |
| JP | 10023303 | 1/1998 |
| JP | 2001086383 | 3/2001 |
| JP | 2001309236 | 11/2001 |
| JP | 2002083280 | 3/2002 |
| JP | 2002094862 | 3/2002 |
| JP | 2003009044 | 1/2003 |
| WO | WO2005045807 | 5/2005 |
| WO | WO2005078597 | 8/2005 |
| WO | WO2005112437 | 11/2005 |

OTHER PUBLICATIONS

U.S. Appl. No. 11/048,644, Jung et al.
U.S. Appl. No. 11/064,787, Jung et al.
U.S. Appl. No. 11/069,909, Jung et al.
U.S. Appl. No. 11/089,530, Jung et al.
U.S. Appl. No. 11/095,768, Jung et al.
U.S. Appl. No. 11/115,078, Jung et al.
U.S. Appl. No. 11/122,274, Jung et al.
U.S. Appl. No. 11/129,045, Jung et al.
U.S. Appl. No. 11/143,970, Jung et al.
U.S. Appl. No. 11/153,868, Jung et al.
U.S. Appl. No. 11/173,166, Jung et al.
U.S. Appl. No. 11/190,516, Jung et al.
U.S. Appl. No. 11/210,284, Jung et al.
U.S. Appl. No. 11/213,324, Jung et al.
U.S. Appl. No. 11/263,587, Levien et al.
U.S. Appl. No. 11/264,701, Jung et al.
U.S. Appl. No. 11/364,496, Jung et al.
U.S. Appl. No. 11/376,627, Jung et al.
U.S. Appl. No. 11/396,279, Jung et al.
U.S. Appl. No. 11/397,357, Levien et al.
U.S. Appl. No. 11/404,104, Levien et al.
U.S. Appl. No. 11/404,381, Levien et al.
U.S. Appl. No. 11/413,271, Jung et al.
U.S. Appl. No. 11/434,568, Jung et al.
U.S. Appl. No. 11/437,284, Levien et al.
U.S. Appl. No. 11/440,409, Levien et al.
U.S. Appl. No. 11/441,785, Jung et al.
U.S. Appl. No. 11/455,001, Jung et al.

(56) References Cited

OTHER PUBLICATIONS

U.S. Appl. No. 11/475,516, Levien et al.
U.S. Appl. No. 11/067,760, Jung et al.
U.S. Appl. No. 11/508,554, Jung et al.
U.S. Appl. No. 11/510,139, Jung et al.
U.S. Appl. No. 11/526,886, Jung et al.
U.S. Appl. No. 11/541,382, Jung et al.
U.S. Appl. No. 11/591,435, Jung et al.
U.S. Appl. No. 11/594,695, Jung et al.
U.S. Appl. No. 11/640,836, Levien et al.
U.S. Appl. No. 11/655,734, Jung et al.
U.S. Appl. No. 11/702,034, Jung et al.
U.S. Appl. No. 11/703,063, Jung et al.
U.S. Appl. No. 12/283,420, Jung et al.
U.S. Appl. No. 12/284,202, Jung et al.
U.S. Appl. No. 12/290,538, Jung et al.
U.S. Appl. No. 12/806,060, Levien et al.
U.S. Appl. No. 13/135,255, Jung et al.
2Tiff.com, "Introduction to 2TIFF," printed on Feb. 16, 2005, downloaded from http://www.2tiff.com/help/, dated 2004, 3 pages.
"About Flickr", dated 2006, downloaded from http://www.flickr.com/about, 2 pages.
"About the SD Memory Card," dated 2004, printed on Mar. 7, 2006, downloaded from http://www.sdcard.org/sd_memorycard/index.html, 3 pages.
About.com, "Image Size and Resolution," printed on Feb. 16, 2005, dated 2005, downloaded from http://graphicssoft.about.com/od/resolution; 3 pages.
Adobe.com, "Share images with Photo Mail (Win only)," printed on Jan. 26, 2005, downloaded from http://www.adobe.com/tips/phsel3photomail/main.html, 4 pages.
Bockaert, Vincent, "Interpolation," dated 1998-2005, printed on Feb. 16, 2005, downloaded from http://www.dpreview.com/learn/?/Glossary/Digital_Imaging/interpolation_01.htm, 4 pages.
Canon.ca, "Print/Share Button," dated Jan. 26, 2005, printed Jan. 26, 2005, downloaded from http://www.canon.ca/digitalphotography/english/ctech_artcile.asp?id-174&tid=6, 2 pages.
cg.its.tudelft.nl, Delft University of Technology, "Shared cameras," printed Jan. 27, 2005, downloaded from http://www.cg.its.tudelift.nl/~spiff/descSC.html, 1 pages.
Chainstyle.com, "Resolution and Image Size," printed on Feb. 16, 2005, downloaded from http://www.chainstyle.com/photoshop/webhelp/tutorials/basics/resolution_and_image_size.htm, 9 pages.
Chastain, Sue, Q. Is it better to use in-camera digital zoom or crop and resample with software, dated 2005, printed on Feb. 17, 2005, downloaded from http://graphicsoft.about.com/cs/digitalimaging/f/digitalzoom.htm, 2 pages.
CNNMoney, "Playboy coming to iPod," dated Jan. 5, 2005, printed on Jan. 26, 2005, downloaded from http://money.cnn.com/en/US/products/hw/switches/ps708/products_white_paper09186a0080088874.shtml, 2 pages.
Co-array.org, "A Brief Overview of Co-Array Fortran," printed on May 3, 2005, downloaded from http://www.co-array.org/caf_intro.htm, 3 pages.
Colbert, Martin et al., "Live, Audio-Visual Communication Systems for Distance Learning: Experience, Heuristics and ISDN," pp. 1-40.
Cummins, Fred, "Synchronization Among Speakers Reduces Macroscopic Temporal Variability," 6 pages.
Darlin, Damon, "Why Do-it-yourself Photo Printing Doesn't Add Up," dated Oct. 8, 2005, printed on Aug. 28, 2006, downloaded from http://www.nytimes.com/2005/10/08/technology_08photo.ready.html, 3 pages.
Dave, "How Many Pixels? a reasoned approach to digicam specifications," dated 1999, printed Feb. 16, 2005, downloaded from http://www.imaging-resource.com/ARTS/HOWBIG/HOWBIG.HTM, 5 pages.
Debian.org, "GNUstep application for digital still cameras," dated Jan. 26, 2005, printed on Jan. 27, 2005, downloaded from http://packages.ebian.org/unstable/graphics/camera.app, 2 pages.

"Digital Cameras Glossary," printed Mar. 8, 2006, downloaded from http://www.crutchfieldadvisor.com/ISEO-rgbtcspd/learningcenter/home/digitalcameras_glossary.html, 3 pages.
"Digital cameras: How to Choose," printed Mar. 8, 2006, downloaded from http://www.crutchfieldadvisor.com/ISEO-rgbtcspd/learningcenter/home/digitalcameras.html, 3 pages.
Digital Photography Review, "Kodak EasyShare One," dated Jan. 6, 2005, printed Jan. 26, 2005, downloaded from http://www.dpreview.com/news/0501/05010605kodakeasyshareone.asp, 5 pages.
Dodd, George, "Music Performance Venues—keeping them in tune with modern requirements," 11 pages.
"Editing & Organizing Photos," Snapfish Website, dated Jan. 20, 2005, downloaded from http://web.archive.org/web/20050405222248/www.snapfish.com/helpediting; printed Apr. 22, 2010, pp. 1-8.
Ekdahl, Lars, "Image size and resolution," dated 2002, printed on Feb. 16, 2005, downloaded from http://www.ekdhal.org/kurs/resolution/resolution2_eng.htm, 5 pages.
El Saddik Abulmotaleb Dr, "Multimedia Communications: Multimedia Technologies and Applications," Multimedia Communications Research Laboratory, School of Information Technology and Engineering, University of Ottawa, Canada, Ontario, Canada, 22 slides, 8 pages.
European Search Report; European Application No. EP07751674.8, May 27, 2009, pp. 1-5.
"Federal Standard 1037C Telecommunications: Glossary of Telecommunication Terms," dated Aug. 7, 1996, printed May 30, 2009, 8 pages, General Services Administration Information Technology Service, Federal Standard 1037C.
"Fujifilm, Summus Collaborate to Provide Wireless Photo Services," dated Feburary 18, 2004, printed Mar. 17, 2006, downloaded from http://phx.corporate-ir.net/phoenix.zhtml?c=131111&p=irol-newsArticle&Id=807972&highlight=", 2 pages.
Geocities.com, "Which is better? Resample the image in a photo editor, print at a low resolution, use Genuine Fractals, or resample in many small steps?", printed on Feb. 16, 2005, downloaded from http://www.geocities.com/roberthaus/olytest/resample.html, 4 pages.
Gizmodo.com, "FlashPoint ShareDrives," dated Jun. 27, printed Jun. 29, 2005, downloaded from http://www.gizmodo.com/gadgets/peripherals/storage/flashpoint-sharedrives-110083.php, 2 pages.
Har-peled, Sariel et al., "Efficient Algorithms for Shared Camera Control," dated 2002, printed Jan. 26, 2005, downloaded from http://citeseerist.psu.edu/har-peled02efficient.html, 2 pages.
Hernandez, J.R. et al., "Coding and Synchronization: A Boost and a Bottleneck for the Development of Image Watermarking," Dept. Tecnologias de las Communicaciones, ETSI Telecom., Universidad de Vigo, Vigo, Spain, 7 pages.
Hewlett-Packard Development Company, L.P., "Presenting the big picture," dated 2003, downloaded from http://www.matrixdisplay.com/pdf/HP_Big_Picture_Main_Brochure_pdf, 7 pages.
Home.Iprimus.com.au, "Digital Cameras and Resampling," printed Feb. 16, 2005, downloaded from http://home.iprimus.com.au/painless/resample.htm., 2 pages.
"HP Image Zone Express step-by-step: HP Instant Share," printed Jan. 26, 2005, downloaded from http://www.hp.com/united-states/ize/steps_instant_share.html, 4 pages.
Hua, Zhigang et al., "COBO: Building Cooperative Environment for Cross-Device Image Sharing," dated Nov. 2004, printed on Jan. 25, 2005, downloaded from http://research.microsoft.com/research/pubs/view.aspx?type=technical+report&id=823, 1 page.
Imaging Resource.com, "The Imaging Resource Quick Review," dated 2001, printed on Feb. 16, 2005, downloaded from http://www.imaging-resource.com/PRODS/1700/170A.HTM, 22 pages.
"Instantly Capture and Share your World with an Intel° PC Camera," printed on Jan. 27, 2005, downloaded from http://www.intel.com/pccamera/, 2 pages.
"Intel® PC Cameras," printed Jan. 27, 2005, downloaded from http://www.intel.com/pccamera/, 2 pages.
Jain Anil K., Fundamentals of Digital Image Processing, 1989, Prentice-Hall, Inc., Englewood Cliffs, New Jersey, USA, pp. 1-569.

(56) References Cited

OTHER PUBLICATIONS

"JVC Everio GZMG77 2.0MP CCD 30GB HDD Camcorder with 10x Optical Zoom," dated 1996-2006, printed Apr. 25, 2006, downloaded from http://www.amazon.com/gp/products/B000E1332W/ref=pd_cp_title/103-4351641-1963832, 8 pages.

Kim, Jeong et al., "Cheris: Smart Digital Photo Frames for Sharing Social Narratives at Home," dated Apr. 22-28, 2006, downloaded from http://www.cs.cmu.edu/~johnz/pubs/2006_CHI_cherish.pdf#search=%22cheris%3B%20smart%20digital%20photo%20frames%20for%20sharing%20social%20narratives%20at%20home%22, 6 pages.

"Kodak Unveils World's First Dual-Lens Digital Camera; Combines Ultra-Wide Angle and Zoom Lenses in Compact Body, " dated Jan. 2, 2006, printed Mar. 7, 2006, downloaded from http://www.kodak.com/eknec/PageQuerier.jhtml?pq-path=2709&pq-locale=en_US&gpcid=0900688a80465805, 2 pages.

Kodak.com, "Frequently Asked Questions," dated Jan. 6, 2005, printed on Jan. 26, 2005, downloaded from http://www.kodak.com/global/en/service/knowledgebase/digital-camera-faqs.jhtml?pq-path=1396/5759, 1 pages.

"Kodak's dual-lens camera," printed Mar. 7, 2006, downloaded from http://news.com/2300.com/2300-1041_3-6014914-2html?tag-ne.gall.pg., 1 pages.

Koren, Norman, "Understanding image sharpness: Digital cameras vs. film, part 2," dated 2000-2004, printed Feb. 3, 2005, downloaded from http:/www.normankoren.com/Tutorials/MTF7A.html, 16 pages.

"Leading Edge Eyecam Extreme High Resolutioon Wireless Color Video Camera System," printed Mar. 9, 2006, downloaded from http://parts.rctoys.com/rc-torys-hobbies/Items/326769%20-%20(S), 2 pages.

LTL Imagery, "About Resolution Understanding Digital Image Resolution," dated 2000-2004, printed Feb. 16, 2005 downloaded from http://www.ltlimagery.com/resolution.html, 10 pages.

Lyons, Max, "Max Lyons Digital Image Gallery," dated 2000-2005, printed Apr. 18, 2006, downloaded from http://www.tawbaware.com/maxlyons/, 3 pages.

Mahmoud, Qusay H., "Getting Started with Data Synchronizatrion Using SyncML," dated Sep. 2004 and 1994-2005, printed May 3, 2005, downloaded from http://developers.sun.com/techtopics/mobility/midp/articles/syncml, 6 pages.

"Merriam-Webster Collegiate Dictionary," Dated 1993 and 1997, 3 pages, Merriam-Webster, Inc., Tenth Edition, Springfield, Massachusetts, USA.

Mills, Elinor, "HD camera, new monitor attacts crowds," dated 1995-2006, printed Mar. 7, 2006, downloaded from http://news.com.com/2102*7353_3-6023300.html?tag=st.util.print, 1 pages.

Mobilemag, "Nikon DH2 WiFi Digital Camera," dated Feb. 20, 2004, printed Jan. 25, 2005, downloaded from http://www.mobilemag.com/content/100/336/C2502, 2 pages.

"Multi Camera Acquisition," dated 2006, printed Aug. 29, 2006, downloaded from http://sine.ni.com/apps/we/niepd_web_display.display_epd4?p_guid=B45EACE3E80B56A4E034080020E74861&p_node=DZ52489&p_source=external, 1 page.

National Instruments Corporation, "Advanced Analog Triggering and Synchronization Techniques," dated 2005, printed on May 3, 2005, http://zone.ni.com/devzone/conceptd.nsf/webmain/A387135C0AC6F6F4E86256C87005FCDDC?opendocument&node=dz00000_us, 2 pages.

National Instruments Corporation, "Genlocking Multiple JAI CV-MI Cameras," dated 2005, printed May 3, 2005, downloaded from http://zone.ni.com/devzone/conceptd.nsf/webmain/7a6b5853548850e886256c21005b1413, 5 pages.

National Instruments Corporation, "Multi-Camera Acquisition," dated 2005, printed May 3, 2005, downloaded from http://zone.ni.com/devzone/conceptd.nsf/webmain/D91BAC1317F9D0A686256C9300769A0D, 3 pages.

New High Capacity SD Memory Card Specification Under Final review by SD Card Association, dated Jan. 4, 2006, SD Card Association News Release, 2 pages.

Ng et al., "Light Field Photography with a Hand-Held Plenoptic Camera," dated 2004-2005, printed on Feb. 27, 2006, downloaded from http://graphics.stanford.edu/papers/lfcamera/, 3 pages.

Nicholls, Kyle, "Non-photorealistic Camera—Depth Edge Detection and Rendering using Multi-Flash Imaging," dated 2000-2006, printed Apr. 18, 2006, downloaded from http://photo.net/learn/technology/mflash/merl-non-photo.html, 3 pages.

OK IP Video . . . Anywhere Solar Powered! "Protecting Critical Government Infrastructure Military and Homeland Surveillance," printed Mar. 9, 2006, downloaded from http://www.oksolar.com/ip_anywhere/, 8 pages.

PCT International Search Report, International Application No. PCT/US2006/42840, dated Sep. 26, 2007, 2 pages.

PCT International Search Report, International Patent Application No. PCT/US206/42584, dated Sep. 28, 2007, 2 pages.

PCT International Search Report, International Application No. PCT/US2007/08341, dated Feb. 7, 2008, 2 pages.

PCT International Search Report, International Application No. PCT/US2007/08342, dated Feb. 7, 2008, 2 pages.

PCT International Search Report, International Application No. PCT/US2006/42734, dated Mar. 26, 2008, 2 pages.

PCT International Search Report, International Application No. PCT/US2006042728, dated Jul. 7, 2008, 2 pages.

PCT International Search Report, International Application No. PCT/US2006/023048, dated Jul. 18, 2008, 2 pages.

PCT International Search Report, International Application No. PCT/US2007/004934, dated Sep. 12, 2008, 2 pages.

PCT International Search Report, International Application No. pCT/US2006/042841, dated Sep. 15, 2008, 2 pages.

PCT International Search Report, International Application No. PCT/US2006/042699, dated Sep. 18, 2008, 2 pages.

Physorg.com, "World's First Built-In Wi-Fi-Enabled Digital Cameras," dated Sep. 2, 2005, printed Sep. 7, 2005, downloaded from http://www.physorg.com/news6183.htm., 3 pages.

Rains, Nick, "Vietnam Travel Photography the Digital Way," dated 2003, printed Feb. 3, 2005, downloaded from http://www.luminous-landscape.com/locations/vietnam.shtml, 7 pages.

Raymond, Emily, "Kodak Digital Cameras; Kodak EasyShare V570 Digital Camera Review," dated Jan. 22, 2006, printed on Apr. 19, 2006, downloaded from http://www.digitalcamerainfo.com/content/Kodak-EasyShare-V570, 2 pages.

Reichmann, Michael, "Understanding Raw Files," Luminous-landscapes.com, printed Oct. 25, 2005, downloaded http://www.luminous-landscape.com/tutorials/understanding-series/u-raw-files.shtml, pp. 1-9.

Ritzcamera.com, "Canon-Powershot A85 Digital Camera," printed Jan. 26, 2005, downloaded from http://www.ritzcamera.com/webapp/wes/stores/servlet/ProductDisplay?storeID=10001&catalogID=10001&langID=-1&productID=13176854, 8 pages.

Roadcasting.org, "A new type of radio," "Final Design," "Process,", "Conclustions," "Recognition," "How Roadcasting Works," "Download," printed Jun. 2, 2005, downloaded from www.roadcasting.org, 15 pages.

Ross, Suzanne,, "The Life of a Digital Photo," printed on Jan. 25, 2005, downloaded from http://research.microsoft.com/displayArticle.aspx?id=605, 5 pages.

"Sanyo Xacit VPC-HDI 5.1MP MPEG4 High Definition Camcorder w/10x Optical Zoom: Product Description," Dated printed Mar. 7, 2006, downloaded from http://www.amazon.com/gp/product/product-description/B000E0E6YC/ref=dp_nav_2/002-0210595-1654445?%5Fencoding=UTF8&n=502394&s=photo, 5 pages.

Sciannamea, Michael, "WiFi-Enabled Digital Camera About to Tap a Growing Marketplace," dated Oct. 12, 2004, printed Jan. 25, 2005, downloaded from http://wifi.comweblosinc.com/entry/7312187118786387, 5 pages.

"Secure Digital Card," printed Mar. 7, 2006, downloaded from http://en.wikipedia.org/wiki/Secure_Digital, 6 pages.

Seifert, Eric et al., "Acoustical Design Considerations and Universal Studios CityWalk™" dated Apr. 23, 1999 and Apr. 24, 1999, printed Jul. 20, 2005, downloaded from http://www.acousticdimensions.com/tech_CityWalk.htm, 5 pages.

Sellen, Abigail et al., "How and Why People Use Camera Phones," dated Nov. 2004, printed Jan. 25, 2005, downloaded from http://

(56) References Cited

OTHER PUBLICATIONS research.microsoft.com/research/pubs/view.aspx?type=technical+report&id=823, 16 pages.

Skillings, Jonathan, "Kodak packs two lenses in latest camera," dated Feb. 7, 2006, printed Mar. 7, 2006, downloaded from http://news.com.com/2102-1041_3-6014939.html?tag-st.util.print, 1 pages.

"Snapfish Privacy Policy," Snapfish Website, dated Jan. 20 2005, downloaded from http://web.archive.org/web/20050403221640/www.snapfish.com/privacy/t_=-0; printed Apr. 22, 2010, pp. 1-5.

"Sony DCR-DVD405 3MP DVD Handycam Camcorder with 10x Optical Zoom," printed Apr. 25, 2006, downloaded from http://www.amazon.com/gp/product/B000EODU7G/ref=pd_cp_title/103-4351641-196383, 12 pages.

"SOUNDaround: Get cinema quality surround sound through two speakers," printed Jul. 20, 2005, http://www.ramelectronics.net/html/soundaround.html, 7 pages.

Starbursthomepage.com, "Life is all about Sharing," printed Jun. 29, 2005, downloaded from http://www.starbursthomepage.com/flashpointx.htm, 1 pages.

starbursthomepage.com, "Sharing-On-The-Go Technology," printed Jun. 29, 2005, downloaded from http://www.starbursthomepage.com/fsotg.htm, 3 pages.

Starbursthomepage.com, "Specifications and Data Transfer Information," printed on Jun. 29, 2005, downloaded from http://www.starbursthomepage.com/fspec/htm, 5 pages.

Starbursthomepage.com, "What are FlashPoint ShareDrives?" printed Jun. 29, 2005, downloaded from http://www.starbursthomepage.com/fproducts.htm, 4 pages.

"Storage device—a Word Definition from the Webopedia Computer Dictionary," dated Oct. 30, 2001 and 2005, printed on Oct. 25, 2005, downloaded from http://www.webopedia.com/TERMS/storage_device.htm, 4 pages.

Sutherland, Ed, "CSR Intros Low-Cost, Single-Chip WiFi," dated Nov. 10, 2004, printed Jan. 25, 2005, downloaded from http://www.wi-fiplanet.com/news/article.php/3434131, 3 pages.

SWGC.mun.ca, "About image size and resolution," printed Feb. 16, 2005, downloaded form http://www.swgc.mun.ca/vart2600/resolution.html, 7 pages.

"Visual Stream: Digital Multimedia USB 1.1 High Resolution PC Camera," dated 2002, pp. 1-4, D-Link Systems, Inc. Irvine, CA.

"What is Flickr?" dated 2006, printed Aug. 28, 2006, downloaded from http:/www.flickr.com/learn_more.gne, 6 pages.

"What is storage device?—A Word Definition From the Webopedia Computer Dictionary," Webopedia.com; dated Oct. 30, 2001 and 2005, printed on Oct. 25, 2005, downloaded from http://www.webopedia.com/TERMS/storage_device.htm; pp. 1-4.

Woodrow, E. et al., "SPIN-IT: a data centric routing protocol for image retrieval in wireless networks, "dated Jun. 24-28, 2002, printed Mar. 19, 2006, downloaded from http://ieeexplore.ieee.org/xpl/absprintf.jsp?arnumber=1039121&pag, 5 pages.

"Yamaha Internet 'MidLive vol. 3': An Open Experiment: The First MidLive to Feature Synchronized Streaming of MIDI and Audio Data," dated Dec. 1997, printed Jul. 19, 2005, downloaded from http://www.yamaha.co.jp/english/news/97121101.html, 5 pages.

\* cited by examiner

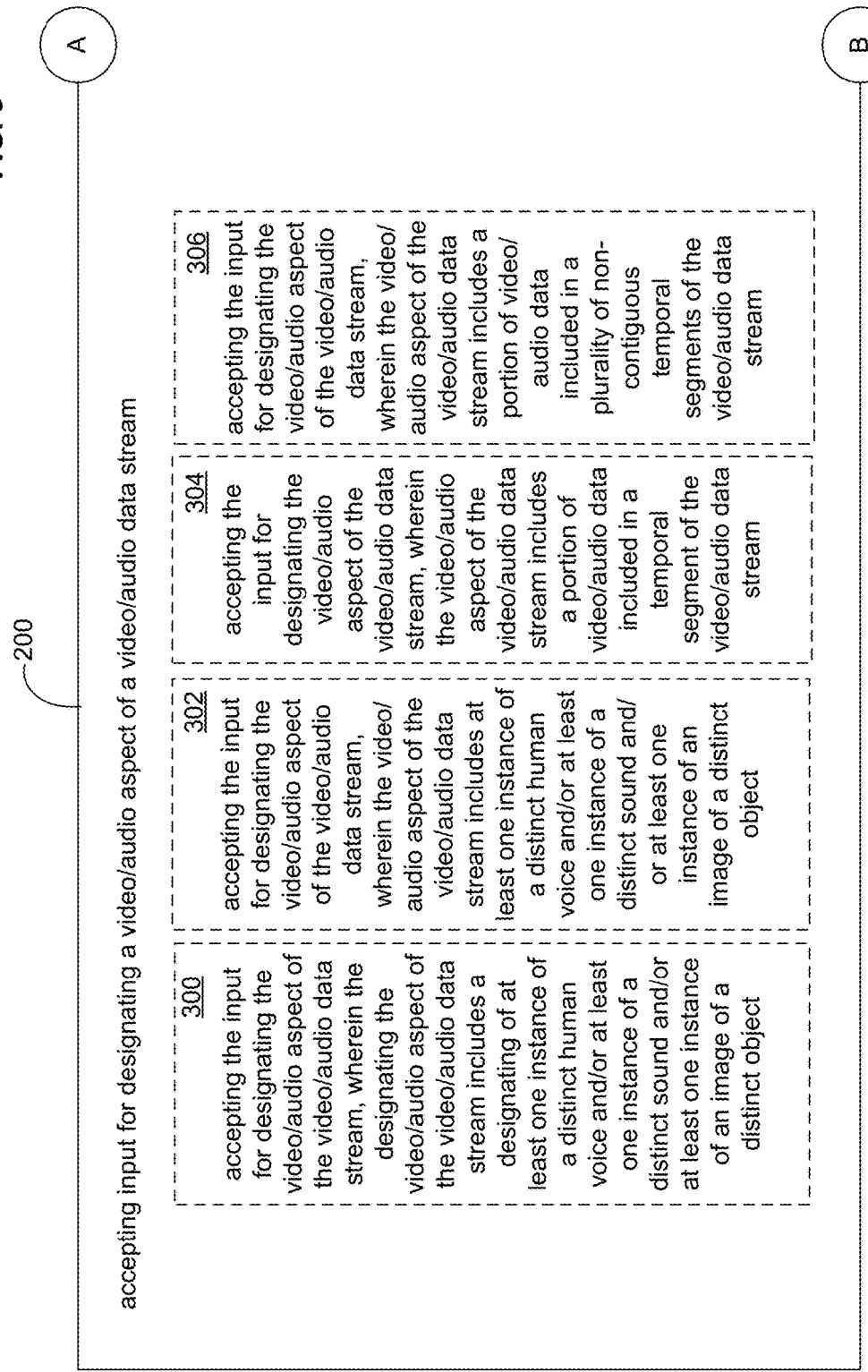

FIG. 5A

| 5A | 5B |

Key To FIG. 5

402 — accepting input for degrading a residue of the video/audio data stream to a second resolution, wherein the residue is excluded from the video/audio aspect, and wherein the second resolution is less than the first resolution, if a condition is met (A)

500 — accepting input for degrading the residue to the second resolution, wherein the second resolution is determined as a function of a distance in the video/audio data stream between at least a part of the video/audio aspect and at least a part of the residue 502 — accepting input for degrading the residue to the second resolution, wherein the degrading is to be performed if a preselected time has elapsed after a specified previous degrading of the residue 504 — accepting input for degrading the residue to the second resolution, wherein the degrading is to be performed if a time value is framed by a preselected time window 506 — accepting input for degrading the residue to the second resolution, wherein the degrading is to be performed if at least one of an available storage space is less than a preselected amount, a condition established by a user is met, and/or a criterion corresponding to a storage management algorithm is met 508 — accepting input for degrading the residue to the second resolution if a condition responsive to an examination of at least one other retained set of video/audio data is met (B)

FIG. 5B

| 5A | 5B |
Key To
FIG. 5

510
accepting input for degrading the residue to the second resolution, wherein the degrading is to be performed if the condition is met, wherein the condition is related to one or more of a set of events and/or conditions excluding a specified previous degrading of the residue

512
accepting input for degrading the residue to the second resolution, wherein the degrading is to be performed if a condition responsive to data received from a device other than a device used for a specified previous degrading of the residue is met

514
accepting input for degrading the residue to the second resolution, wherein the degrading is to be performed if a condition responsive to data received from a device other than a device to be used for the degrading is met

516
accepting input for degrading the residue to the second resolution, wherein the method includes a method implemented in a first device, and wherein the degrading is to be performed if a condition responsive to data received from a second device is met

518
accepting input for a designation of a second resolution value

A

B

PRESERVATION/DEGRADATION OF VIDEO/AUDIO ASPECTS OF A DATA STREAM

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 11/263,587, entitled Saved Image Management, naming Royce A. Levien, Robert W. Lord, and Mark A. Malamud, as inventors, filed Oct. 31, 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/264,701, entitled Conditional Alteration of a Saved Image, naming Royce A. Levien, Robert W. Lord, and Mark A. Malamud, as inventors, filed Nov. 1, 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/364,496, entitled Imagery Processing, naming Edward K. Y. Jung, Royce A. Levien, Robert W. Lord, Mark A. Malamud, and John D. Rinaldo, Jr., as inventors, filed Feb. 28, 2006, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/376,627, entitled Data Management of a Data Stream, naming Edward K. Y. Jung, Royce A. Levien, Robert W. Lord, Mark A. Malamud, and John D. Rinaldo, Jr., as inventors, filed Mar. 15, 2006, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/396,279, entitled Data Management of an Audio Data Stream, naming Edward K. Y. Jung, Royce A. Levien, Robert W. Lord, Mark A. Malamud, and John D. Rinaldo, Jr., as inventors, filed Mar. 31, 2006, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/413,271, entitled Data Management of Audio Aspects of a Data Stream, naming Edward K. Y. Jung, Royce A. Levien, Robert W. Lord, Mark A. Malamud, and John D. Rinaldo, Jr., as inventors, filed Apr. 28, 2006, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/434,568, entitled Degradation/Preservation Management of Captured Data, naming Edward K. Y. Jung, Royce A. Levien, Robert W. Lord, Mark A. Malamud, and John D. Rinaldo, Jr., as inventors, filed May 15, 2006, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/441,785, entitled Preservation and/or Degradation of a Video/Audio Data Stream, naming Edward K. Y. Jung, Royce A. Levien, Robert W. Lord, Mark A. Malamud, and John D. Rinaldo, Jr., as inventors, filed May 26, 2006, which is currently co-pending, or is an application of which a currently co-pending application is entitled to the benefit of the filing date.

For purposes of the USPTO extra-statutory requirements, the present application constitutes a continuation of U.S. patent application Ser. No. 11/455,001, entitled Preservation/Degradation of a Video/Audio Aspects of a Data Stream, naming Edward K. Y. Jung, Royce A. Levien, Robert W. Lord, Mark A. Malamud, and John D. Rinaldo, Jr., as inventors, filed Jun. 16, 2006, which is currently co-pending, or is an application of which a currently co-pending application is entitled to the benefit of the filing date.

For purposes of the USPTO extra-statutory requirements, the present application constitutes a continuation of U.S. patent application Ser. No. 13/134,744, entitled Preservation/Degradation of a Video/Audio Aspects of a Data Stream, naming Edward K. Y. Jung, Royce A. Levien, Robert W. Lord, Mark A. Malamud, and John D. Rinaldo, Jr., as inventors, filed Jun. 15, 2011, which is currently co-pending, or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. § § 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

TECHNICAL FIELD

The present application relates, in general, to data management.

SUMMARY

In one aspect, a method related to data management includes but is not limited to accepting input for designating a video/audio aspect of a video/audio data stream; and accepting input for retaining the video/audio aspect of the video/audio data stream at a first resolution. In addition to the foregoing, other method aspects are described in the claims, drawings, and text forming a part of the present application.

In one aspect, a system related to data management includes but is not limited to circuitry for accepting input for designating a video/audio aspect of a video/audio data stream; and circuitry for accepting input for retaining the video/audio aspect of the video/audio data stream at a first resolution. In addition to the foregoing, other system aspects are described in the claims, drawings, and text forming a part of the present application.

In one or more various aspects, related systems include but are not limited to circuitry and/or programming and/or electro-mechanical devices and/or optical devices for effecting the herein-referenced method aspects; the circuitry and/or programming and/or electro-mechanical devices and/or optical devices can be virtually any combination of hardware, software, and/or firmware configured to effect the herein-referenced method aspects depending upon the design choices of the system designer skilled in the art.

In one aspect, a program product related to data management includes but is not limited to a signal bearing medium bearing one or more instructions for accepting input for designating a video/audio aspect of a video/audio data stream; and one or more instructions for accepting input for retaining the video/audio aspect of the video/audio data stream at a first resolution. In addition to the foregoing, other program product aspects are described in the claims, drawings, and text forming a part of the present application.

In addition to the foregoing, various other method, system, and/or program product aspects are set forth and described in the teachings such as the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIGS. 3A and 3B depict several alternative implementations of the high-level flowchart of FIG. 2;

FIGS. 5A and 5B depict several alternative implementations of the high-level flowchart of FIG. 4.

The use of the same symbols in different drawings typically indicates similar or identical items.

DETAILED DESCRIPTION

Figure 1A:
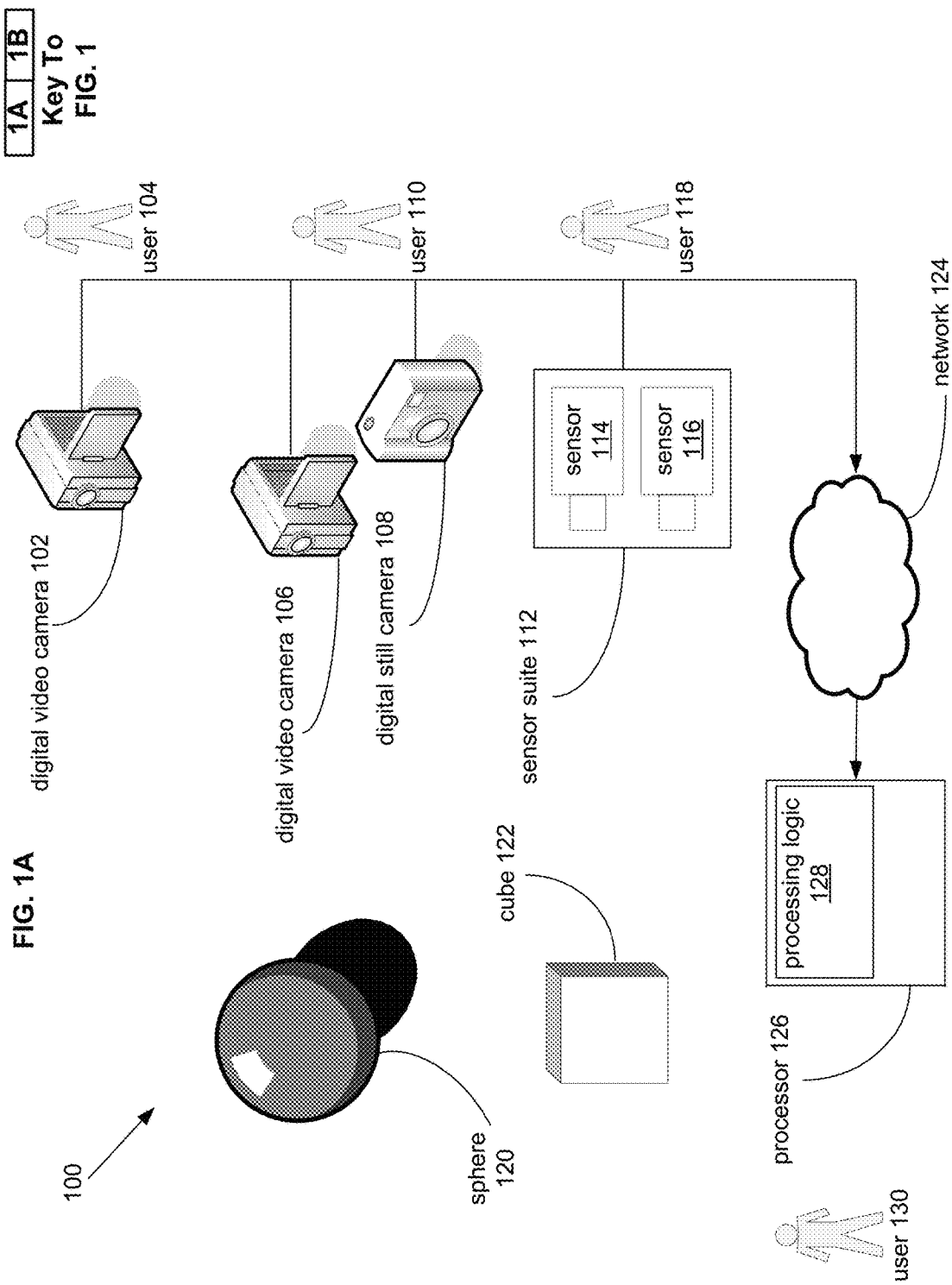
FIGS. 1A and 1B depict two exemplary environments in which the methods and systems described herein may be represented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1B:
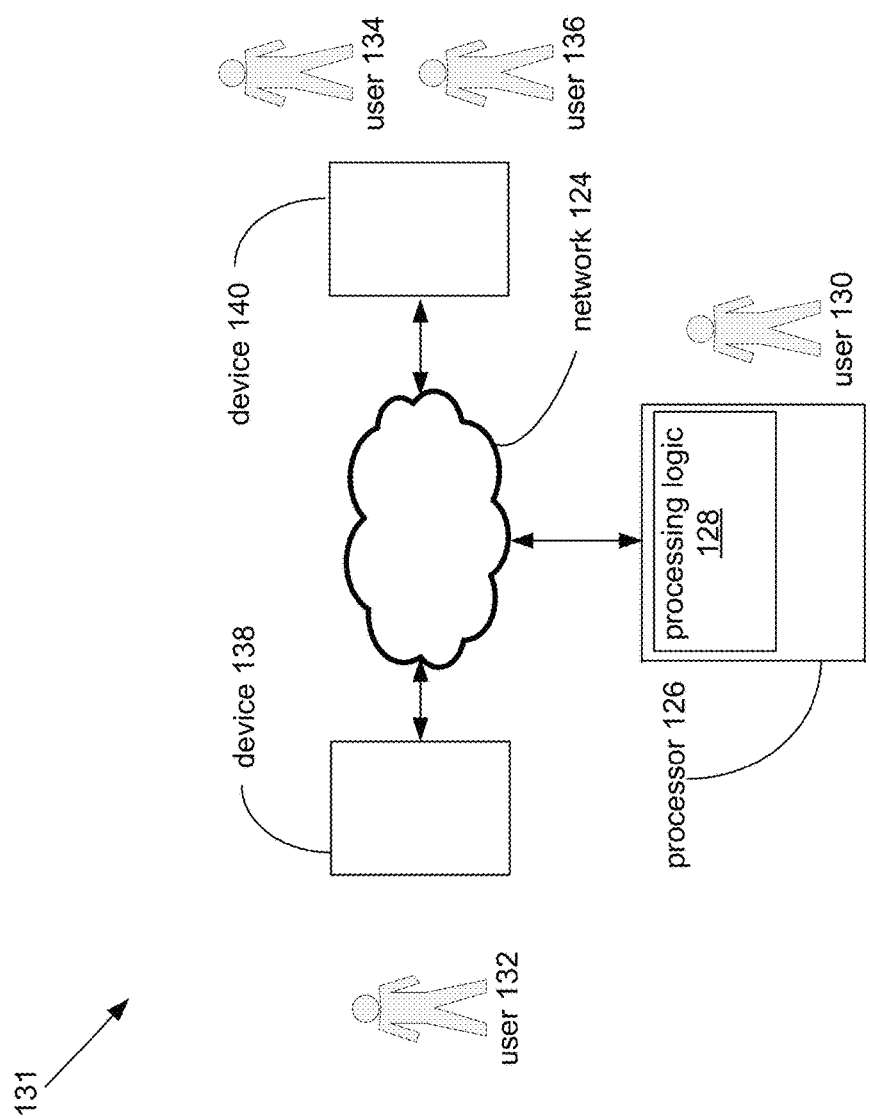

FIG. 1 depicts two exemplary environments in which the methods and systems described herein may be represented. In the depicted exemplary environment 100, illustrated are a variety of exemplary sensors: a digital video camera 102 operated by one or more users represented by user 104, where the digital video camera 102 may have a capability to record audio input; a digital video camera 106 used in conjunction with a digital still camera 108, where the digital video camera 106 and/or digital still camera 108 may either or both have a capability to record audio input, both operated by one or more users represented by user 110; and a sensor suite 112 comprising more than one sensor represented by sensor 114 and sensor 116 (wherein the sensors 114 and 116 may be but need not be physically co-located, and may be but need not be of the same type, e.g., sensor 114 may be an infrared device and sensor 116 may be a radar device, or, e.g. sensor 114 may be a microphone and the sensor 116 may be an infrared/visible light device), the sensor suite being operated by one or more users represented by user 118. Taken by themselves, each of the sensors 114 and 116 are exemplary of single independent sensors, and further, either of the sensors 114 or 116 may be audio sensors. The exemplary sensors may represent a variety of devices for the detection and/or the recording and/or the transmission of imagery aspects, e.g., images, and/or audio aspects, e.g., instances of particular voices and/or instances of particular sounds, including but not limited to microphones, digital video cameras, digital still cameras, digital sensor (e.g. CCD or CMOS) arrays, and radar sets. The exemplary users 104, 110, and/or 118 may, for example, operate the exemplary sensors manually or may supervise and/or monitor their automatic operation. The exemplary users 104, 110, and/or 118 may operate the exemplary sensors in physical proximity to the sensors or remotely. The exemplary sensors may also operate autonomously without exemplary users 104, 110, and/or 118. As used herein, "video/audio aspect" and "video/imagery/audio aspect" include a video aspect and/or an imagery aspect and/or an audio aspect, where "video aspect" and "imagery aspect" include data representing one or more moving or still images of one or more persons and/or objects and "audio aspect" includes audio data representing one or more instances of one or more human voices and/or one or more sounds. Similarly, "video/audio data" and "video/imagery/audio data" include video data and/or imagery data and/or audio data, where "video data" and "imagery data" include data representing moving or still visual representations of objects and/or people and "audio data" includes data representing voices and/or sounds. Further, "video/audio data stream" and "video/imagery/audio data stream" include a data stream including video data and/or imagery data and/or audio data; and "video/audio input" and "video/imagery/audio input" include input that includes video data and/or imagery data and/or audio data.

The exemplary sensors may be used to detect and/or record and/or transmit images and/or sounds and/or other data related to a wide variety of objects, represented in FIG. 1 by exemplary objects, a sphere 120 and a cube 122. The sphere 120 and/or the cube 122 may be reflectors and/or emitters of electromagnetic radiation such as visible light and/or microwaves, reflectors and/or emitters of particulate radiation such as electrons and/or neutrons, and/or reflectors and/or emitters of sonic energy. The sphere 120 and the cube 122 are representative of any object(s) or groups of objects, images and/or emitting and/or reflecting sources of sounds and/or other related data which may be detectable and/or recordable and/or transmissible by the exemplary sensors, including but not limited to persons, animals, buildings, roads, automobiles, trucks, aircraft, ships, spacecraft, landscape and/or seascape features, vegetation, and/or celestial objects. When used together in any given example herein, the exemplary sphere 120 and the exemplary cube 122 generally represent two distinct objects which may or may not be of the same or of a similar type, except where otherwise required by the context, e.g., a sphere 120 and a cube 122 used together in an example may represent a first particular object and a second particular object, e.g., a particular person and a particular building, or a particular first aircraft and a particular second aircraft, respectively. When used alone in any given example herein, the designated exemplary object, e.g., the sphere 120 or the cube 122, generally represents the same object, except where otherwise required by the context, e.g., a sphere 120 used alone in an example generally represents a single object, e.g., a single building, and a cube 122 used alone generally represents a single object, e.g., a particular person.

Each of the exemplary sensors may detect and/or record and/or transmit images and/or sounds and/or other related data of the exemplary objects in a variety of combinations and sequences. For instance, the digital video camera 102 may detect and/or record and/or transmit an image and/or sound and/or other related data of the sphere 120 and then an image and/or sound and/or other related data of the cube 122 sequentially, in either order; and/or, the digital video camera 106 may detect and/or record and/or transmit a single image and/or sound and/or other related data of the sphere 120 and the cube 122 together.

Similarly, the digital video camera 106 may detect and/or record and/or transmit an image and/or sound and/or other related data of the sphere 120 and of the cube 122 sequentially, in either order, and/or of the sphere 120 and the cube 122 together, before, after, partially simultaneously with, or simultaneously with an operation of the digital still camera 108. The digital still camera 108 may detect and/or record and/or transmit an image and/or sound and/or other related data of the sphere 120 and of the cube 122 sequentially, in either order, and/or of the sphere 120 and the cube 122 together, before, after, partially simultaneously with, or simultaneously with an operation of the digital video camera 106.

Similarly, the sensor 114 and the sensor 116 of the sensor suite 112 may detect and/or record and/or transmit an image and/or sound and/or other related data of the sphere 120 and of the cube 122 sequentially, in either order, and/or of the sphere 120 and the cube 122 together, before, after, partially simultaneously with, or simultaneously with respect to each other.

Such images and/or sounds and/or related data may be recorded and/or transmitted via a computer or computers represented by the network 124 and/or directly to a processor 126 and/or processing logic 128, which accept data representing imagery aspects and/or sounds and/or related data pertaining to the exemplary objects. The processor 126 represents one or more processors that may be, for example, one or more computers, including but not limited to one or more laptop computers, desktop computers, and/or other types of computers. The processing logic 128 may be hardware/software/firmware (e.g., hardware and/or software and/or firmware) associated with the processor 126 and capable of accepting and/or processing data representing imagery and/or sounds and/or other related data aspects of the exemplary objects from the exemplary sensors and from memory in the case of data stored in memory. Such processing may include but is not limited to comparing at least a portion of the data from one sensor with at least a portion of the data from the other sensor, and/or applying a mathematical process and/or heuristic process to at least a portion of the data from one sensor with at least a portion of the data from the other sensor, and/or accepting input related to the analysis, manipulation, and/or retention of data from the sensors, including but not limited to live, substantially live, and/or retained data, e.g., stored in memory. Such processing may also include, but is not limited to, deriving third data from combining at least a portion of the data from one sensor with at least a portion of the data from another sensor.

The digital video camera 102, the digital video camera 106, the sensor 114 and/or the sensor 116 (operating as components of sensor suite 112 or separately as single independent sensors) may be capable of detecting and/or recording and/or transmitting information representing video/audio input and accepting input representing information for the manipulation and/or retention of such video/audio information, including but not limited to accepting input for a designation of a reference designator in a video/audio data stream (e.g., a data stream including video and/or audio information) originating from one of the exemplary sensors via detection and/or transmission and/or playback; accepting input for a designation of a temporal beginning designator and/or a beginning demarcation designator in such a video/audio data stream; accepting input for a designation of a temporal ending designator and/or an ending demarcation designator in such a video/audio data stream; and accepting input for retaining at a high resolution a portion of such a video/audio data stream beginning substantially at the temporal beginning designator and/or the beginning demarcation designator and ending substantially at the temporal ending designator and/or the ending demarcation designator. Such input may include confirmation of previous input. Further, the processor 126 and/or the processing logic 128 may be capable of receiving such a video/audio data stream from the exemplary sensors and/or from other computing resources and/or capable of playback of such a video/audio data stream that has been previously retained within the processor 126 and/or the processing logic 128 and/or elsewhere. In addition, processor 126 and/or the processing logic 128 may be capable of accepting input representing information for the manipulation and/or retention of such audio information, including the input described herein in connection with the exemplary sensors.

In accepting input, an embodiment may accept input initiated in a variety of ways, including but not limited to initiation by one or more human users such as the users 104, 110, 118, and/or 130; by the action of one or more processors and/or processing logic integral with, associated with, and/or operably coupled to a device such as the digital video camera 102; by the action of a one or more processors such as the processor 126 and/or by processing logic such as the processing logic 128; and/or by a combination of human and processor/processing logic interaction, such as a user 130 interacting with the digital still camera 108 and/or the processor 126 and/or the processing logic 128.

Accepting input from one or more human users such as the users 104, 110, 118, and/or 130 may include but is not limited to accepting input initiated by interaction with various interface devices such as computer mouse devices, keyboards, and graphical user interfaces; with interface devices that detect sound, such as microphones; with interface devices that detect electromagnetic radiation, such as visible and/or infrared light sensors and cameras; and with interface devices that present visual interface features such as graphical user interfaces.

Accepting input initiated by the action of one or more processors and/or processing logic, such as the processor 126 and/or the processing logic 128 may include but is not limited to accepting input initiated by a processor and/or processor logic analysis of a data stream including detection of video/imagery/audio data that satisfies certain conditions and/or parameters that require or indicate the usefulness of designation of those aspects or of reference points indicating the presence and/or limits of those aspects. For example, the processor 126 and/or the processing logic 128 may, in an analysis of a video/imagery/audio data stream, whether the stream be live, substantially live, or retained data, detect the beginning of voice of a particular person of interest whose vocal characteristics are available to the processor 126 and the processing logic 128 and which are used to define detection/recognition parameters, and the processor 126 and/or the processing logic 128 may, upon detection of the voice using those parameters, initiate input to designate a portion of the data stream including the voice for retention.

Accepting input initiated by a combination of human and processor/processing logic interaction, such as a user 130 interacting with the digital still camera 108 and/or the processor 126 and/or the processing logic 128, may include but is not limited to a user such as user 110 interacting with the digital video camera 106, the processor 126, and the processing logic 128 to review a video/imagery/audio data stream, detect video/imagery/audio aspects of interest such as images and voices of particular people and to designate for retention, command retention of, and retain those aspects of interest.

With regard to accepting input designating a video/imagery aspect and/or an audio aspect of a video/audio data stream, such input may represent an indication from an exemplary user 104, 110, 118, and/or 130, or from the processor 126 and/or the processing logic 128, of a video/imagery aspect and/or an audio aspect, e.g., video/imagery/audio information of interest, such as a particular human voice or a particular mechanical sound, e.g., an auto engine, or the relative absence of sound, such as a relative silence between two human speakers or two musical phrases, and/or an image of a particular person of interest. Such designation may be for the purpose or purposes of, e.g., retention at high resolution, interactive review of the portion of the video/audio data stream of interest, or analysis of the portion of interest. A video/imagery aspect and/or an audio aspect may be characterized at least in part by a temporal beginning, a temporal ending, an intensity and/or range of intensities and/or distribution of intensities, a frequency and/or range of frequencies and/or distribution of frequencies.

With regard to input for a designation of a reference designator in a video/audio data stream, such input may represent an indication from an exemplary user 104, 110, 118, and/or 130, or from the processor 126 and/or the processing logic 128, of video/imagery/audio information of interest, such as a particular human voice or a particular mechanical sound, e.g., an auto engine, or the relative absence of sound, such as a relative silence between the speeches of two human speakers or two musical phrases, or an image of a particular object of interest. The reference designator may be designated in the video/audio data stream such that it falls within and/or references a place within the portion of the video/audio data stream comprising the particular video/imagery/audio aspect of interest. The reference designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for video/imagery/audio data of interest.

With regard to input for designation of a temporal beginning designator and/or a beginning demarcation designator in a video/audio data stream, such input may represent an indication from an exemplary user 104, 110, 118, and/or 130, or from the processor 126 and/or the processing logic 128, of a point in the video/audio data stream at which a portion of interest of the video/audio data stream begins, such as (but not limited to) the end of a relative silence (e.g., silence except for background and/or artifact noise) occurring last before a designated reference designator, the beginning of the sound of interest or of one or more of the sounds accompanying a sound of interest, or the end of a sound occurring last before a designated reference designator, or the beginning of a video image of a particular person of interest. The temporal beginning designator and/or the beginning demarcation designator may be designated in the video/audio data stream such that it falls within and/or references a place at or near the beginning of the portion of the video/audio data stream comprising the particular sound of interest. The temporal beginning designator and/or the beginning demarcation designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for demarcation of video/imagery/audio data of interest.

With regard to input for designation of a temporal ending designator and/or an ending demarcation designator in a video/audio data stream, such input may represent an indication from an exemplary user 104, 110, 118, and/or 130, or from the processor 126 and/or the processing logic 128, of a point in the video/audio data stream at which a portion of interest of the video/audio data stream ends. The temporal ending designator and/or the ending demarcation designator may represent the point in the video/audio data stream falling at the end of a portion of interest, such as (but not limited to) the end of the presence of an image of a vehicle of interest, the end of a relative silence (e.g., silence except for background and/or artifact noise) occurring just after the end of the sound of interest or of one or more of the sounds accompanying a sound of interest, or the end of a sound occurring just after a designated reference designator. The temporal ending designator and/or the ending demarcation designator may be designated in the video/audio data stream such that it falls within and/or references a place at or near the end of the portion of the video/audio data stream comprising the particular sound of interest. The temporal ending designator and/or the ending demarcation designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for video/imagery/audio data of interest.

With regard to input for retaining at a high resolution a portion of a video/audio data stream, including but not limited to a video/imagery/audio aspect of a video/audio data stream, such high resolution retention includes but is not limited to storage of a relatively large amount of data, compared to storage of portions of the data stream not selected for high resolution retention, as described herein. Such input may include but is not limited to designation of a high resolution value, e.g., 0.5 MB/second, and/or frequency spectrum characteristics, e.g., lower and upper frequency cut-offs. For example, the user 130 may provide input to the processor 126 and/or the processing logic 128 to identify a portion of a video/audio data stream for retention at high resolution, e.g., input designating an audio aspect of a video/audio data stream and/or input designating a video/imagery aspect of a video/audio data stream. The processor 126 and/or the processing logic 128 may accept the input, enabling the identified portion (e.g., a designated audio aspect) to be stored with high fidelity relative to the source video/audio and with a relatively small proportion of data (if any) discarded, while the portion or portions not selected for high resolution retention, e.g., a residue, may be stored at a relatively lower resolution, e.g., with a relatively higher proportion of data discarded, e.g., to save storage resources.

Retention of a portion, e.g., a video/imagery/audio aspect, of a video/audio data stream at a relatively high resolution and retention of portions of the video/audio data stream not included in the portion designated for retention at the high resolution, e.g., a residue, may result in storage of the portion not included in the portion to be retained at the high resolution at one or more resolutions that do not use all of the data available, such that the portion not to be retained at the high resolution is degraded in storage. Degradation of a portion not included in the portion retained or designated for retention at high resolution may be achieved by retaining the not-included portion at one or more lower resolutions, where the one or more lower resolutions may be a function of the distance in the video/audio data stream between the portion to be retained at a high resolution and the portion to be retained at one or more lower resolutions, including but not limited to degrading blocks of data not included in the high resolution portion according to their distance from the high resolution portion (e.g., degrading to one lower resolution a portion between 0 and 60 seconds from the high resolution portion, and degrading to another, even lower resolution a portion between 60 and 120 seconds from the high resolution portion, and so on). One or more inputs may be accepted to set one or more rules by which a portion of a video/audio data stream not included in a portion designated for high resolution retention is degraded and/or retained at one or more lower resolutions. One or more inputs for degradation may be accepted to specify parameters including but not limited to one or more specific resolution values (e.g., 12 kB/sec and/or 20 kB/sec), one or more frequency range characteristics, and/or one or more frequency distribution characteristics. Degradation to one or more lower resolutions may be correlated to one or more specified frequency ranges and/or one or more specified frequency distribution characteristics, such as specific lower resolutions for all sounds above 100 Hz, and/or between 2 kHz and 20 kHz, and/or below 5 kHz, and/or one or more specific lower resolutions for all sounds conforming to a specific frequency distribution characteristic of a particular human voice or musical instrument, and/or, with regard to video/imagery, specific lower resolution for parts of a video/audio data stream that do not include video/imagery of a particular color range. Degradation to one or more lower resolutions may be correlated to the time frame in which a portion of a video/audio data stream has been detected and/or recorded and/or transmitted and/or stored, e.g., video/audio data detected and/or recorded and/or transmitted and/or stored within a week may be retained at the resolution at which it was detected and/or recorded and/or transmitted and/or stored, while data detected and/or recorded and/or transmitted and/or stored between one and two weeks ago may be degraded to 80% of the resolution at which it was detected and/or recorded and/or transmitted and/or stored, and data detected and/or recorded and/or transmitted and/or stored between two and four weeks ago may be degraded to 60% of the resolution at which it was detected and/or recorded and/or transmitted and/or stored, and so on. One or more inputs may be accepted to confirm previous inputs or default values related to degrading data and/or retaining such data at a relatively lower resolution value. One or more inputs may be accepted for degrading a portion of a video/audio data stream not included in a portion designated for retention at high resolution. Inputs may include but not be limited to tactile, sonic, and/or visual inputs. Such an input may be initiated by an action by a user 104, 110, 118, or 130, e.g., pressing a mouse button and/or speaking into a microphone, or the input may be initiated by operation of some hardware/ software/firmware, e.g., audio processing software such as the processor 126 and/or the processing logic 128, or it may be initiated by some combination of human and automated action.

In addition to accepting inputs for degrading to at least one lower resolution a portion of a video/audio data stream not included in a portion designated for retention at high resolution, degrading and/or retaining at a lower resolution a portion of a video/audio data stream not included in a portion designated for retention at high resolution may also be performed. Retention at one or more lower resolutions may be performed, e.g., by using one or more memory locations associated with and/or operably coupled to the digital video camera 102 and/or the digital video camera 106 and/or the sensor 114 and/or the sensor 116 and/or the processor 126 and/or the processing logic 128. Degradation may be performed by methods including but not limited to data compression and/or data redaction.

With respect to this example, input for the identification of a particular portion for retention at a relatively higher resolution does not preclude input for the storage of a distinct and/or an overlapping portion of the data stream at a distinct higher resolution compared to the retention resolution of one or more portions not identified for retention at a higher resolution, e.g., one or more portions of a data stream may be identified for retention at one or more relatively high resolutions. Similarly, input for the identification of a particular portion for retention at a relatively lower resolution does not preclude input for the storage of a distinct and/or an overlapping portion of the data stream at a distinct lower resolution compared to the retention resolution of one or more portions identified for retention at a higher resolution, e.g., one or more portions of a data stream may be identified for retention at one or more relatively lower resolutions.

Further, a video/imagery aspect may be designated for retention or retained at a particular resolution on the basis of a presence or absence of some audio aspect of a video/audio stream, and an audio aspect may be designated for retention or retained at a particular resolution on the basis of a presence or absence of some video/imagery aspect of a video/audio stream. For instance, the presence of an image of a particular person of interest in a video/audio data stream may serve as the basis for a designation of an audio aspect of the video/audio data stream for retention at high resolution, and vice versa.

A particular portion identified for retention at a high or a low resolution may include more than one data set that may generally be considered to constitute a "frame" in a video/audio data stream. With respect to this example, digital video cameras 102 and/or 106 are representative of any sensor or sensor suite capable of detecting and/or recording and/or transmitting video/audio input as one or more data streams representing the video/audio information. Such input may be initiated in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for video/imagery/audio data of interest.

With regard to retaining at a high resolution a portion of a video/audio data stream, e.g., a video/imagery/audio aspect of the video/audio data stream, such retention may include storage in computer memory, such as memory associated with and/or operably coupled to the processor 126 and/or the processing logic 128.

The exemplary sensors may be capable of detecting and/or recording and/or transmitting one or more imagery and/or sound and/or other related data aspects of the exemplary objects, the one or more imagery aspects and/or sound and/or other related data aspects being defined in part, but not exclusively, by exemplary parameters such as focal length, aperture (f-stop being one parameter for denoting aperture), t-stop, shutter speed, sensor sensitivity (such as film sensitivity (e.g., film speed) and/or digital sensor sensitivity), exposure (which may be varied by varying, e.g., shutter speed and/or aperture), frequency and/or wavelength, focus, depth of field, white balance (and/or white point, color temperature, and/or micro reciprocal degree or "mired"), signal/noise ratio, an identified voice of a person or machine, and/or flash (sound aspects are described elsewhere herein). Some or all of the parameters that may define at least in part imagery and/or sounds and/or other related data aspects may have further defining parameters. For example, a frequency and/or wavelength parameter may be associated with one or more bandwidth parameters; and a flash parameter may be associated with one or more parameters for, e.g., duration, intensity, and/or special distribution. Note that although certain examples herein discuss bracketing and/or imagery aspects and/or exemplary parameters in the context of more or less "still" images for sake of clarity, techniques described herein are also applicable to streams of images, such as would typically be produced by digital video cameras 102/106 and thus the use of such, and other, exemplary terms herein are meant to encompass both still and video bracketing/aspects/parameters/etc. unless context dictates otherwise. For instance, the bracketing might include bracketing over, say, 20 frames of video.

Each of the exemplary sensors may detect and/or record and/or transmit one or more imagery aspects and/or sound aspects and/or other related data aspects of an exemplary object at more than one setting of each of the available parameters, thereby bracketing the exemplary object. Generally, "bracketing" includes the imagery technique of making several images of the same object or objects using different settings, typically with a single imagery device such as digital video camera 106. For example, the digital video camera 106 may detect and/or record and/or transmit a series of imagery aspects of the cube 122 at a number of different f-stops; before, after, partially simultaneously with, and/or simultaneously with that series of imagery aspects, another digital video camera 106 and/or another type of sensor, such as sensor 114 may detect and/or record and/or transmit a series of imagery aspects of the sphere 120 and of the cube 122 at a number of different white balances. The processor 126 and/or the processing logic 128 may then accept, via the network 124 or directly, data representing the imagery aspects detected and/or recorded and/or transmitted by the digital video cameras 102 and 106 or by the digital video camera 106 and the sensor 114. The processor 126 and/or the processing logic 128 may then combine at least a portion of the data from one of the sensors with at least a portion of the data from another sensor, e.g., comparing the data from the two sensors, for example, deriving an identity of color and orientation from the bracketing imagery aspect data of two cubes 122 from digital video camera 106 and sensor 114.

Exemplary digital video cameras 102 and/or 106 may also be capable of detecting and/or recording and/or transmitting video/audio input as one or more data streams representing the video/audio information. Exemplary users 104 and/or 110 and/or another person and/or entity such as user 130 may provide input to the digital video camera 102 and/or the processor 126 and/or the processing logic 128 to select at least a portion of a data stream representing the video/audio information for retention at high resolution (where retention at high resolution is as described herein), e.g., imagery such as an image of a particular object and/or an audio aspect such as an instance of a particular voice and/or an instance of a particular sound. With respect to this example, digital video cameras 102 and/or 106 are representative of any sensor or sensor suite capable of detecting and/or recording and/or transmitting video/audio input as one or more data streams representing the video/audio information.

Those skilled in the art will appreciate that the explicitly described examples involving the exemplary sensors (e.g., the digital video camera 102, the digital video camera 106, the digital still camera 108, and the sensor suite 112 including sensor 114 and sensor 116), the exemplary users (e.g., users 104, 110, and 118), the exemplary objects (e.g., the sphere 120 and the cube 122), the network 124, the exemplary processor 126, and the exemplary processing logic 128 constitute only a few of the aspects illustrated by FIG. 1A.

In the exemplary environment 131, users 130, 132, 134, and 136 may be participants in a teleconference conducted using voice-over-internet-protocol ("VoIP") technology, such as that provided by such commercial concerns as Vonage® and Skype™. User 132 uses device 138, which may include a computer, a telephone equipped for VoIP communication such as an analog telephone adaptor, an IP phone, or some other item of VoIP-enabling hardware/software/firmware, to conduct a conversation by audio means with users 134 and 136 using device 140, which also may include a computer, a telephone equipped for VoIP communication such as an analog telephone adaptor, an IP phone, or some other item of VoIP-enabling hardware/software/firmware. The devices 138 and 140 are representative of any number of such devices that may be used to conduct a VoIP teleconference including any number of participating parties. Because VoIP uses packet switching, packets conveying audio data travel between the device 138 and the device 140 by different routes over the network 124 to be assembled in the proper order at their destinations. During a conversation in this exemplary environment, an audio data stream may be formed as packets are created and/or transmitted at a source device, either the device 138 or the device 140, and this audio data stream is reassembled at the destination device. Audio data streams may be formed and reassembled at the devices 138 and 140 simultaneously. Multiple audio data streams representing different speakers or other distinct audio information sources may be generated and reassembled by the devices 138 and/or 140 during a VoIP teleconference.

Where VoIP technology is being used in conjunction with users using standard telephone equipment connected to the Public Switched Telephone Network ("PSTN"), packets created by VoIP equipment such as the device 138 and/or 140 are conveyed over the network 124, reassembled by a device analogous to the devices 138 and/or 140, and transmitted to the standard telephone user over the PSTN.

An exemplary embodiment may include accepting input designating an audio aspect of an audio data stream created at the device 138 and/or the device 140, where the designation may be for the purpose or purposes of, e.g., retention at high resolution, interactive review of the portion of the audio data stream of interest, or analysis of the portion of interest. An exemplary embodiment may include accepting input for a designation of a reference designator in an audio data stream created at the device 138 and/or the device 140, accepting input for a designation of a beginning demarcation designator an audio data stream created at the device 138 and/or the device 140, accepting input for a designation of an ending demarcation designator an audio data stream created at the device 138 and/or the device 140, accepting input for retaining at high resolution, e.g., storing at high resolution in computer memory, audio data from the audio data stream beginning substantially at the beginning demarcation designator and ending substantially at the ending demarcation designator, and retaining at a high resolution such audio data. These operations may be performed by, for example the processor 126 and/or the processing logic 128, which may be incorporated with the device 138 and/or 140, partially incorporated with the device 138 and/or 140, or separated but operably coupled to the device 138 and/or 140. Each of these operations may be initiated by human action, e.g., the user 130 and/or 132 and/or 134 and/or 136 pressing a button, speaking into a microphone, and/or interacting with graphical user interface features, or they may be initiated by operation of some hardware/software/firmware, e.g., audio processing software such as the processor 126 and/or the processing logic 128, or they may be initiated by some combination of human and automated action. Each of these operations may be performed as an audio data stream is being created at the device 138 and/or 140, and/or as an audio data stream is being reassembled at the device 138 and/or 140, and/or as an audio data stream stored from a VoIP teleconference is played back or analyzed.

A reference designator may include information such as an identifier that identifies the particular audio data stream of interest and a place in the audio data stream at which the information of interest is present, e.g., a place in the stream at which a particular speaker is speaking, and/or may fall within the audio data stream at such a place. A beginning demarcation designator may include an identifier that identifies the particular audio data stream of interest and an identifier of the first packet of a sequence of packets of interest and/or may fall within the audio data stream. An ending demarcation designator may include an identifier that identifies the particular audio data stream of interest and an identifier of the last packet of a sequence of packets of interest and/or may fall within the audio data stream.

Accepting input for retaining at high resolution a designated aspect of an audio data stream, as described elsewhere herein, may be performed, e.g., by using the devices 138 and/or 140 in addition to the devices for accepting input described in connection with FIG. 1. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., audio processing software such as the processor 126 and/or the processing logic 128 and/or devices 138, 140, or it may be initiated by some combination of human and automated action. Retaining at a high resolution a portion of an audio data stream designated for retention at a high resolution, as described elsewhere herein, may be performed, e.g., using memory resources associated with and/or operably coupled to the devices 138 and/or 140 in addition to the devices for data retention described in connection with FIG. 1.

Accepting input for degradation and/or retaining at a lower resolution a portion of an audio data stream not included in a portion of the audio data stream designated for retention at a high resolution, as described elsewhere herein, may be performed, e.g., by using the devices 138 and/or 140 in addition to the devices for accepting input described in connection with FIG. 1. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action. Degradation and/or retaining at a lower resolution a portion of an audio data stream not included in a portion of the audio data stream designated for retention at a high resolution, as described elsewhere herein, may be performed, e.g., using memory resources associated with and/or operably coupled to the devices 138 and/or 140 in addition to the devices for data retention described in connection with FIG. 1.

Those skilled in the art will appreciate that the explicitly described examples involving the exemplary sensors (the digital video camera 102, the digital video camera 106, the digital still camera 108, and the sensor suite 112 including sensor 114 and sensor 116), the exemplary devices (138 and 140) the exemplary users (users 104, 110, 118, 130, 132, 134, and 136), the exemplary objects (the sphere 120 and the cube 122), the network 124, the exemplary processor 126, and the exemplary processing logic 128 constitute only a few of the aspects illustrated by FIG. 1.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
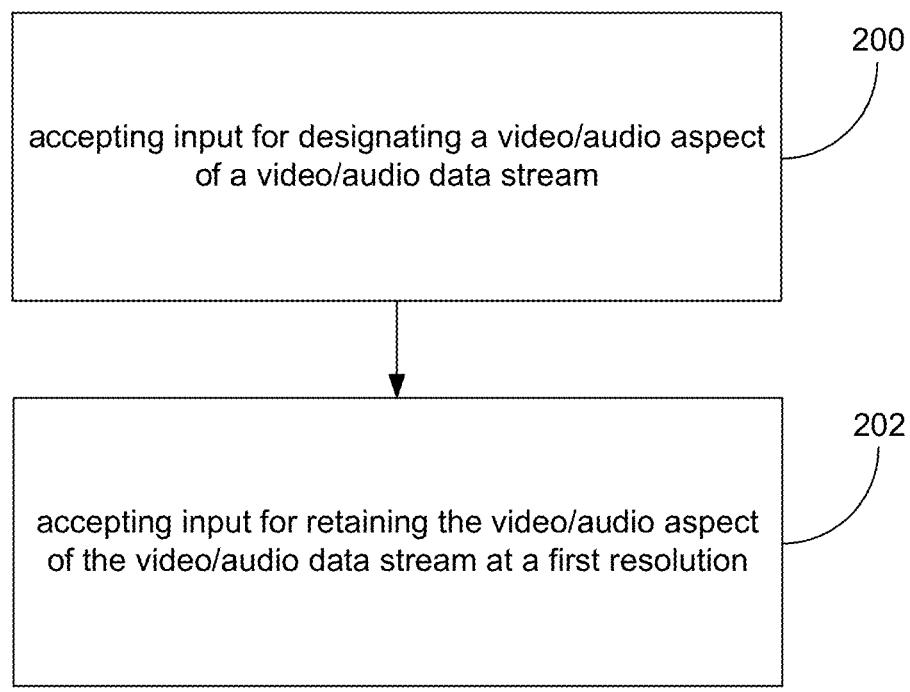
FIG. 2 depicts a high-level logic flowchart of an operational process.

FIG. 2 depicts a high-level logic flowchart of an operational process. The illustrated process may include operation 200 and/or operation 202. Operation 200 shows accepting input for designating a video/audio aspect of a video/audio data stream. Operation 200 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating one or more instances of a particular voice and/or mechanical noise such as an automobile engine in a video/audio data stream, by means of, e.g., a reference designator, specification of beginning and/or ending time indices, and/or specification of video and/or audio characteristics. The video/audio data stream may be, for example, a live or substantially live data stream from a sensor or sensors or an apparatus or an apparatus set such as that associated with a VoIP teleconference, such as devices 138 and/or 140, or a stored set of data that is being reviewed in playback or analyzed, either by one or more human users, one or more automated systems, or some combination of the two. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 202 depicts accepting input for retaining the video/audio aspect of the video/audio data stream at a first resolution. Operation 202 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for retaining, at a relatively high resolution, of the video/audio aspect of the video/audio data stream designated by the input accepted in operation 200, in one or more memory locations associated with and/or operably coupled to the digital video camera 102 and/or the digital video camera 106 and/or the sensor 114 and/or the sensor 116 and/or the processor 126 and/or the processing logic 128 and/or the device 138 and/or the device 140. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Figure 3B:
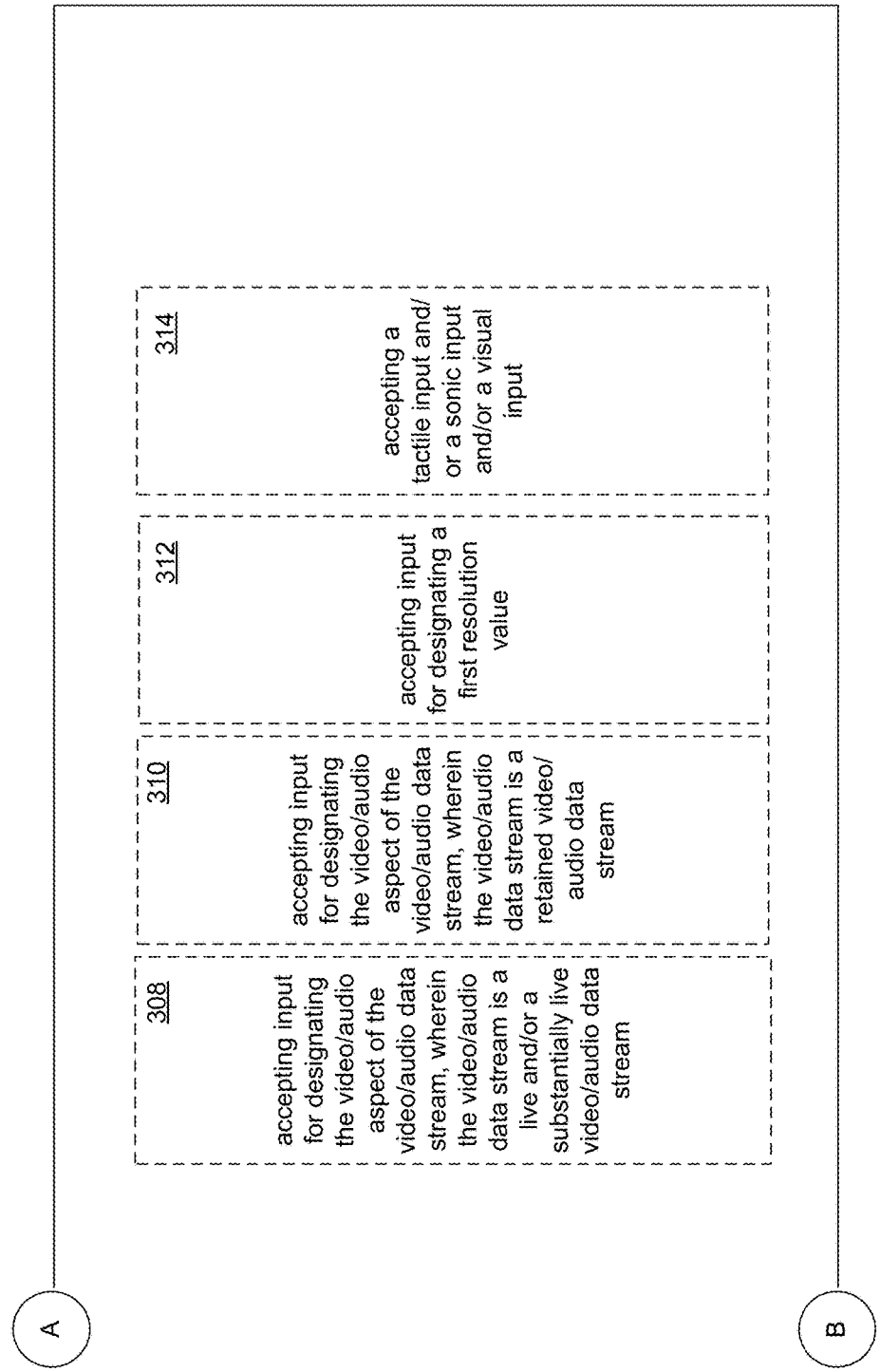

FIG. 3 depicts several alternative implementations of the high-level flowchart of FIG. 2. Operation 200—accepting input for designating a video/audio aspect of a video/audio data stream—may include one or more of the following operations: 300, 302, 304, 306, 308, 310, 312, and/or 314.

Operation 300 shows accepting the input for designating the video/audio aspect of the video/audio data stream, wherein the designating the video/audio aspect of the video/audio data stream includes a designating of at least one instance of a distinct human voice and/or at least one instance of a distinct sound and/or at least one instance of an image of a distinct object. Operation 300 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating for inclusion in the video/audio data stream one or more instances of a distinct human voice, e.g., a sequence of utterances by a single speaker or a set of speakers in a live or a recorded conversation, such as a conversation conducted using VoIP, where the voice or voices may be temporally isolated or may be temporally overlapped by other voices and/or sounds but separable by discernment of distinct characteristics such as tonal quality or frequency, by, for instance, a human listener and/or by an automated voice recognition system.

Operation 300 may also include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating for inclusion in the video/audio data stream one or more instances of a distinct sound or a set of distinct sounds, e.g., the sounds emitted from a particular musical instrument or a group of instruments, a distinct and particular automobile engine's sonic emissions or a group of such engines' sonic emissions, or some disparate suite of sounds such as one or more machine noises and one or more animal noises, where the sound or sounds of interest may be temporally isolated or may be temporally overlapped by other sounds but separable by use of distinct characteristics such as tonal quality or frequency, by, for example, one or more human listeners and/or one or more automated sound analysis system.

Operation 300 may further include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating for inclusion in the video/audio data stream one or more instances of a distinct image or a set of distinct images, e.g., images of people or objects of interest, represented for example by the sphere 120 and/or the cube 122, where the image or images of interest may be partially overlapped by other images but are separable by use of distinct characteristics such as color or shape, by, for example, one or more human users and/or one or more automated image analysis systems.

Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 302 illustrates accepting the input for designating the video/audio aspect of the video/audio data stream, wherein the video/audio aspect of the video/audio data stream includes at least one instance of a distinct human voice and/or at least one instance of a distinct sound and/or at least one instance of an image of a distinct object. Operation 302, for example, may include accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating a video/audio data stream that includes one or more instances of a distinct human voice, e.g., a contribution to a conversation, such as a VoIP teleconference, where the voice or voices may be temporally isolated or may be temporally overlapped by other voices and/or sounds but separable by discernment of distinct characteristics such as tonal quality or frequency, by, for instance, a human listener and/or by an automated voice recognition system.

Operation 302 may also include, for instance, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating for inclusion in the video/audio data stream one or more instances of a distinct sound or set of sounds, such as the sonic emissions of a group of distinct and particular machines or of a group of distinct and particular animal calls, e.g., where the sound or sounds of interest may be temporally isolated or may be temporally overlapped by other sounds but separable by use of distinct characteristics such as tonal quality or frequency, by, for example, one or more human listeners and/or one or more automated sound analysis system.

Operation 302 may also include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating for inclusion in the video/audio data stream one or more instances of a distinct image or set of distinct images, such as images of particular people or objects of interest, where the image or images of interest may be partially overlapped by other images but are separable by use of distinct characteristics such as color or shape, by, for example, one or more human users and/or one or more automated image analysis systems.

Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 304 depicts accepting the input for designating the video/audio aspect of the video/audio data stream, wherein the video/audio aspect of the video/audio data stream includes a portion of video/audio data included in a temporal segment of the video/audio data stream. Operation 304 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating a video/audio aspect of the video/audio data stream that includes video and/or audio data from a single segment of the stream with no, or substantially no, time-wise breaks or gaps. Such a temporal segment might run, for instance, from one point in time in the stream to another point in time in the stream. Such a temporal segment might include, for instance, the video and/or audio of a bank customer's interaction with a teller as recorded by a security surveillance system, from the time the customer steps up to the counter to the time he leaves the system's visual field of view. Further, such a temporal segment might exclude sounds and/or voices other than those desired by a human user or selected by an automated processing system through the use of filtering to retain only a voice (or voices) and/or a sound (or sounds) of interest, such as retaining the voices of the customer and the teller in the example of the bank customer's interaction with the teller. It will be appreciated by those skilled in the art that a portion of video/audio data included in a temporal segment of the video/audio data stream may encompass part or all of such video data in the temporal segment. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 306 depicts accepting the input for designating the video/audio aspect of the video/audio data stream, wherein the video/audio aspect of the video/audio data stream includes a portion of video/audio data included in a plurality of non-contiguous temporal segments of the video/audio data stream. Operation 306 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating a video/audio aspect of the video/audio data stream that includes two or more segments of the stream, each of which has no, or substantially no, time-wise breaks or gaps, but which are separated from each other by time-wise breaks or gaps. Such a plurality of temporal segments might include, for example, three instances of a particular human voice in a conversation involving two people, such that the video/audio aspect includes each instance of one of the two voices but excludes the other voice. Similarly, a plurality of temporal segments may be such that the video/audio aspect might include a disconnected series of clips of a video of a person in which she appears in camera range, excluding clips in which she does not appear, and possibly excluding other video images in the frames in which she appears. Further, such a plurality of temporal segments might include, for example, a combination of video and audio data, such as a set of video/audio clips, separated from each other in time, of one person in a conversation, each of which shows her speaking and contains the audio of her speech, but omits those periods in which she is silent. Such a plurality of temporal segments might exclude, from any or all of the temporal segments, sounds and/or voices and/or images other than those desired by a human user or selected by an automated processing system through the use of filtering and/or masking and/or image discrimination to retain only a voice (or voices) and/or a sound (or sounds) and/or an image (or images) of interest. To take another example, a video/audio aspect might include the video data representing a single person in a set of video/audio clips, each separated in time from the others, of a crowded room, as determined by a human user and/or by an automated object discrimination system. Another video/audio aspect might include the audio data of one particular person among many in a multiple-person conversation, and still another video/audio aspect might include video of such a person only when he is in camera range and audio data consisting of his contributions to the conversation while omitting audio data of others' speech. Such a video/audio aspect might exclude sounds and/or voices and/or images other than those desired by a human user and/or selected by an automated processing system through the use of filtering and/or masking and/or image discrimination to retain only a voice (or voices) and/or a sound (or sounds) and/or an image (or images) of interest. It will be appreciated by those skilled in the art that a portion of video/audio data included in a plurality of temporal segments of the video/audio data stream may encompass part or all of such video data in one or more of the temporal segments of the plurality of such segments. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or processing logic 128 and/or devices 138, 140, or it may be initiated by some combination of human and automated action.

Operation 308 shows accepting input for designating the video/audio aspect of the video/audio data stream, wherein the video/audio data stream is a live and/or a substantially live video/audio data stream. Operation 308, for example, may include accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating a video/audio aspect of a video/audio data stream originating from the digital video camera 106, where the video/audio data stream is originating from the digital video camera 106 as, or substantially as (e.g., with a minimal delay), the data is being detected and/or recorded and/or transmitted. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 310 shows accepting input for designating the video/audio aspect of the video/audio data stream, wherein the video/audio data stream is a retained video/audio data stream. Operation 310, for example, may include, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating a video/audio aspect of a video/audio data stream from the digital video camera 106, where the video/audio aspect is being played backed from data storage or is being recalled from storage for analysis. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 312 illustrates accepting input for designating a first resolution value. Operation 312 may include, for instance, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for designating a particular high resolution value for audio data, such as 96 kB/sec (as compared to a relatively lower resolution value such as 12 kB/sec), and/or for designating a particular high resolution value for video data of a video/audio aspect of a video/audio data stream, such as 1 MB/sec (as compared to a relatively lower value of 0.1 MB/sec). Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 314 depicts accepting a tactile input and/or a sonic input and/or a visual input. Operation 314 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, where the input may be initiated by a user 104, 110, 118, 130, 132, 134, and/or 136 mechanically manipulating an interface device and/or feature, such as a mouse input device, and/or interacting with a drop-down menu of a graphical user interface.

Operation 314 may further include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, where the input may be initiated by a user 104, 110, 118, 130, 132, 134, and/or 136 speaking and/or generating some sonic signal such as a click or a whistle into an interface device such as a microphone, or where the input may be initiated by an automated operation of the processor 126 and/or the processing logic 128 playing back a recording of such a sonic signal.

Operation 314 may also include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, where the input may be initiated by a user 104, 110, 118, 130, 132, 134, and/or 136 interacting with a video input device such as a camera and/or a light/infrared sensor and/or a visual component of a graphical user interface, or where the input may be initiated by an automated operation of the processor 126 and/or the processing logic 128 playing back a recording of a visual signal or of an interaction with a graphical user interface. It should be understood that visual input is not limited to the visual spectrum of a human, but also may include virtually any portion of the electromagnetic spectrum that a machine and/or an apparatus is capable of detecting. It should also be understood that examples of visual input may include but are not limited to gestural input, e.g., a hand sign, detection of captured electromagnetic spectrum data indicative of a motion of a capturing device (e.g., such as might be detected if a camera were moved in a predefined way). It should also be understood that a sign may include but is not limited to a static sign (e.g., holding up a victory sign with two fingers and/or holding up a printed sign that says "now"), and/or a dynamic sign (e.g., something like clapping or waving).

Figure 4:
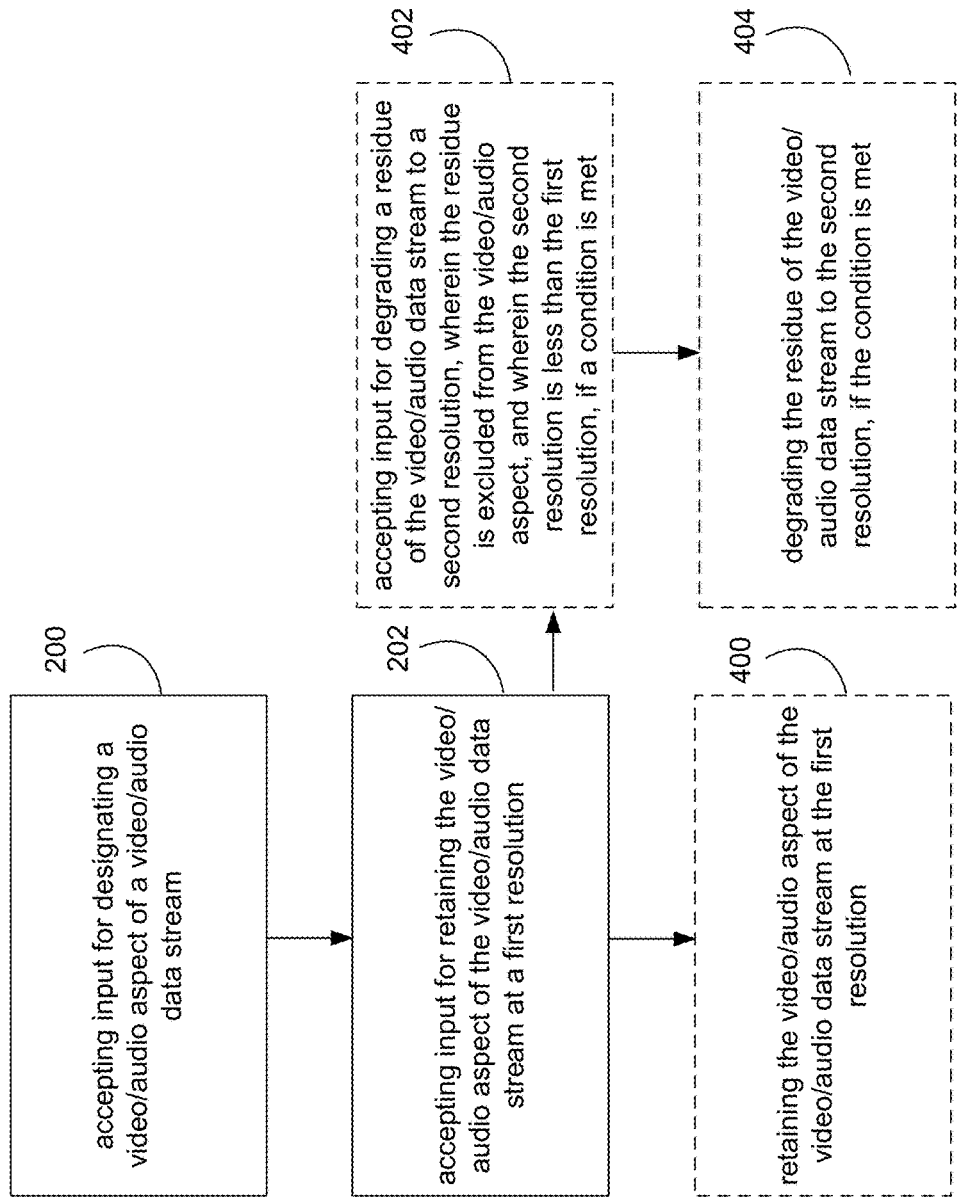
FIG. 4 illustrates a high-level logic flowchart of an operation process.

FIG. 4 illustrates a high-level logic flowchart of an operation process. The illustrated process may include the following operations: 200 (described elsewhere herein), 202 (described elsewhere herein), 400, 402, and/or 404.

Operation 400 illustrates retaining the video/audio aspect of the video/audio data stream at the first resolution. Operation 400 may include, for example, retaining a video/audio aspect of a video/audio data stream, where the video/audio aspect is designated by an input and such retention is in response to an input to retain the video/audio aspect, at a relatively high resolution in one or more memory locations associated with and/or operably coupled to the digital video camera 102 and/or the digital video camera 106 and/or and/or the digital still camera 108 and/or the sensor 114 and/or the sensor 116 and/or the processor 126 and/or the processing logic 128 and/or the device 138 and/or the device 140.

Operation 402 shows accepting input for degrading a residue of the video/audio data stream to a second resolution, wherein the residue is excluded from the video/audio aspect, and wherein the second resolution is less than the first resolution, if a condition is met. Operation 402 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for degrading a residue of the video/audio data stream that is not included in a video/audio aspect designated for retention at a relatively high resolution, via, e.g., data redaction and/or data compression, to one or more relatively low resolutions, such as video/audio data included in a temporal segment of the video/audio data stream that is not designated for retention at high resolution and/or temporal segments that are not designated for retention at high resolution. Such a lower resolution may include a resolution of zero (e.g., deletion or non-storage of the residue). Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 404 depicts degrading the residue of the video/audio data stream to the second resolution, if the condition is met. Operation 404 may include, for example, degrading a residue of a video/audio data stream relative to retention of another portion of the video/audio data stream designated for retention at a relatively high resolution, via a processor 126 and/or a processing logic 128 and/or a digital video camera 102 and/or a digital video camera 106 and/or a sensor 114 and/or a sensor 116 and/or a device 138 and/or device 140, to a low resolution, such as 12 kB/second compared to 96 kB/second. Such a degrading may be performed via hardware/software/firmware constituting computational resources and via one or more memory locations, where the computational resources and memory locations are associated with and/or operably coupled to the digital video camera 102 and/or the digital video camera 106 and/or the digital still camera 108 and/or the sensor 114 and/or the sensor 116 and/or the processor 126 and/or the processing logic 128 and/or the device 138 and/or the device 140.

FIG. 5 depicts several alternative implementations of the high-level flowchart of FIG. 4. Operation 402—accepting input for degrading a residue of the video/audio data stream to a second resolution, wherein the residue is excluded from the video/audio aspect, and wherein the second resolution is less than the first resolution, if a condition is met—may include the following operations: 500, 502, 504, 506, 508, 510, 512, 514, 516, and/or 518.

Operation 500 shows accepting input for degrading the residue to the second resolution, wherein the second resolution is determined as a function of a distance in the video/audio data stream between at least a part of the video/audio aspect and at least a part of the residue. Operation 500 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for degrading, via, e.g., data redaction and/or data compression, a residue of a video/audio data stream according to the distance between a part of the residue to be degraded and a part of a video/audio aspect designated for retention at high resolution, e.g., degradation to 75% of the video/audio data available in a residue from between 0 and 30 seconds before the video/audio aspect designated for retention at high resolution, degradation to 50% of the video/audio data available in a residue from between 30 and 60 seconds before the video/audio aspect designated for retention at high resolution, and degradation to 25% of the video/audio aspect available in a residue from between 60 and 90 seconds before the video/audio aspect designated for retention at high resolution. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 502 illustrates accepting input for degrading the residue to the second resolution, wherein the degrading is to be performed if a preselected time has elapsed after a specified previous degrading of the residue. Operation 502 for example, may include, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for degrading a residue of a video/audio data stream to a relatively low resolution one week after that residue was stored for the first time by a particular user, e.g., user 104. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 504 depicts accepting input for degrading the residue to the second resolution, wherein the degrading is to be performed if a time value is framed by a preselected time window. Operation 504, for example, may include accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for degrading a residue of a video/audio data stream to a relatively low resolution when the time between an initial review of the portion by a user, e.g. user 110, and the present time is framed by, e.g., included within, a preselected time window of one month to six months prior to the present time. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 506 shows accepting input for degrading the residue to the second resolution, wherein the degrading is to be performed if at least one of an available storage space is less than a preselected amount, a condition established by a user is met, and/or a criterion corresponding to a storage management algorithm is met. Operation 506 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for degrading a residue of a video/audio data stream to a relatively low resolution, if one or more available storage spaces provide less than a preselected amount of storage space, e.g., less than 50 MB, such that more storage space is made available for a designated video/audio aspect of a video/audio data stream to be retained at a relatively high resolution; and/or a condition established by user 104, such as the passage of one month from a previous access of a video/audio aspect and/or a residue; and/or a storage management algorithm criterion, such as no increase in a combined available storage space of across five storage devices in a month, are met. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 508 illustrates accepting input for degrading the residue to the second resolution if a condition responsive to an examination of at least one other retained set of video/audio data is met. Operation 508, for example, may include accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for degrading a residue of a video/audio data stream to a relatively low resolution if, upon examination, it is found that another retained set of video/audio data contains information that decreases the usefulness of a high-resolution retention of the residue under consideration for retention at low resolution, such as a finding that a first surveillance record of a location does not include any video/audio record of a particular person in a second surveillance record that includes that person, so that there is no interest in retaining the second surveillance record at high resolution, indicating that the second record, the residue under consideration, may be retained at a relatively low resolution. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 510 shows accepting input for degrading the residue to the second resolution, wherein the degrading is to be performed if the condition is met, wherein the condition is related to one or more of a set of events and/or conditions excluding a specified previous degrading of the residue. Operation 510, for example, may include accepting input, via the digital video camera 102 and/or the digital video still camera 106 and/or the digital still camera 108 and/or the sensor 114 and/or the sensor 116 and/or the processor 126 and/or the processing logic 128 and/or the device 138 and/or the device 140, for degrading to a relatively low resolution a residue of a video/audio data stream if that residue is being considered for such a degrading immediately after being received from and/or recorded by a sensor, e.g., digital still camera 108. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 512 depicts accepting input for degrading the residue to the second resolution, wherein the degrading is to be performed if a condition responsive to data received from a device other than a device used for a specified previous degrading of the residue is met. Operation 512 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for degrading residue of a video/audio data stream to a relatively low resolution if a storage medium device that was not used for a specified previous retention of the residue provides an indication that it has less than a particular amount of available storage capacity. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 514 illustrates accepting input for degrading the residue to the second resolution, wherein the degrading is to be performed if a condition responsive to data received from a device other than a device to be used for the degrading is met. Operation 514 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for degrading a residue of a video/audio data stream to a relatively low resolution if a storage medium that is not to be used for retention of the residue at the low resolution provides an indication that information stored on it does not specify a requirement that the residue be retained at a high resolution, such as an indication from a storage medium not to be used for retention of the residue at a low resolution that a particular vehicle is of interest to a user, e.g., user 118, when video/audio data regarding that vehicle is not included in the residue. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 516 shows accepting input for degrading the residue to the second resolution, wherein the method includes a method implemented in a first device, and wherein the degrading is to be performed if a condition responsive to data received from a second device is met. Operation 516 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, for degrading a residue of a video/audio data stream to a relatively low resolution, where the method related to data management is implemented in the processor 126 and/or the processing logic 128, if the processor 126 and/or the processing logic 128 receive from a back-up storage unit an indication that the storage capacity available in the back-up storage unit is less than a specified capacity. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Operation 518 shows accepting an input for a designation of a second resolution value. Operation 518 may include, for example, accepting input, via the digital video camera 102 and/or the digital video camera 106 and/or the digital still camera 108 and/or the sensor 114 and/or the sensor 116 and/or the processor 126 and/or the processing logic 128 and/or the device 138 and/or the device 140, from a user 104, 110, 118, 130, 132, 134, and/or 136 for designation of a particular resolution value to which to degrade a residue of a video/audio data stream, such as 6 kB/second. Such an input may be initiated by an action by a user 104, 110, 118, 130, 132, 134, and/or 136, e.g., pressing a mouse button and/or speaking into a microphone, or the input may be initiated by operation of some hardware/software/firmware, e.g., processing software such as the processor 126 and/or the processing logic 128 and/or devices 138, 140, or it may be initiated by some combination of human and automated action.

Figure 6:
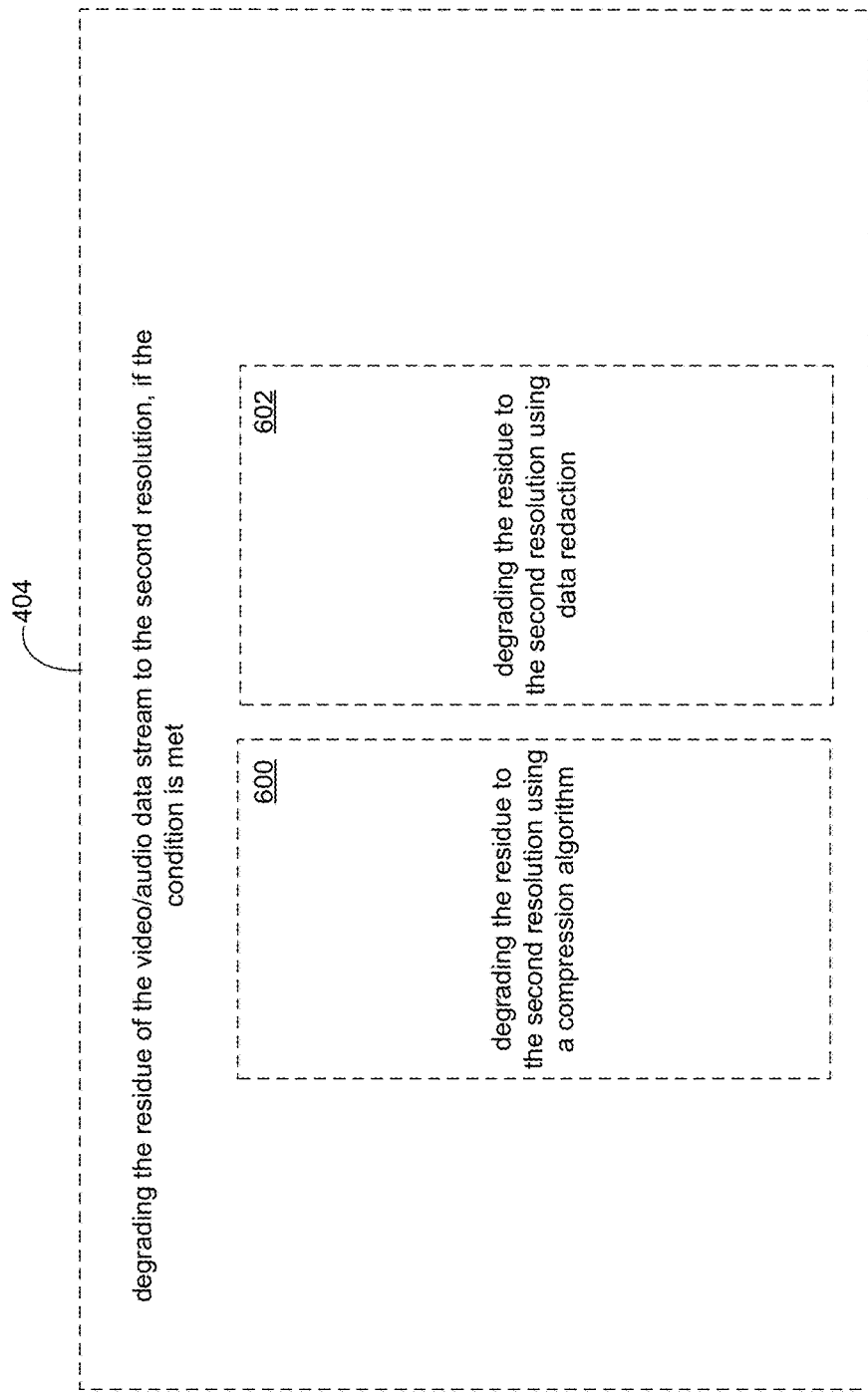
FIG. 6 depicts several alternative implementations of the high-level flowchart of FIG. 4.

FIG. 6 depicts several alternative implementations of the high-level flowchart of FIG. 4. Operation 404—degrading the residue of the video/audio data stream to the second resolution, if the condition is met—may include the following operations: 600 and/or 602.

Operation 600 depicts degrading the residue to the second resolution using a compression algorithm. Operation 600 may include, for example, degrading, via a processor 126 and/or a processing logic 128 and/or a digital video camera 102 and/or a digital video camera 106 and/or a sensor 114 and/or a sensor 116 and/or a device 138 and/or device 140, a residue of a video/audio data stream to a low resolution relative to retention of a video/audio aspect at a high resolution, such as 12 kB/second compared to 96 kB/second, where the low resolution is obtained using a compression algorithm, e.g., a lossy compression algorithm, on the residue. In this example, the compression algorithm may be stored and/or run using the processor 126 and/or the processing logic 128 and/or the digital video camera 102 and/or the digital video camera 106 and/or the digital still camera 108 and/or the sensor 114 and/or the sensor 116 and/or the device 138 and/or device 140 and/or some computational unit operably coupled to one or more of those devices.

Operation 602 illustrates degrading the residue to the second resolution using data redaction. Operation 602 may include, for example, degrading, via a processor 126 and/or a processing logic 128 and/or a digital video camera 102 and/or a digital video camera 106 and/or a sensor 114 and/or a sensor 116 and/or a device 138 and/or device 140, a residue of a video/audio aspect to a low resolution relative to retention of a video/audio aspect of the video/audio data stream, such as 12 kB/second compared to 96 kB/second, where the low resolution is obtained using data redaction on the residue, by redacting data representing, e.g., the higher and lower frequencies of audio data in such a residue, and/or the extraneous parts of video data in such a residue, aside from video data of interest in the residue. In this example, a program for data redaction may be stored and/or run using the processor 126 and/or the processing logic 128 and/or the digital video camera 102 and/or the digital video camera 106 and/or the digital still camera 108 and/or the sensor 114 and/or the sensor 116 and/or the device 138 and/or device 140 and/or some computational unit operably coupled to one or more of those devices.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method related to data management, the method comprising:
   accepting input for designating a video/audio data stream having a first resolution;
   accepting input for degrading at least a portion of the video/audio data stream to a second resolution different than the first resolution if at least one network condition is met; and
   transmitting at least one of the video/audio data stream at the first resolution or the portion of the video/audio data stream at the second resolution, the transmitting the portion of the video/audio data stream at the first resolution or the video/audio data stream at the second resolution based at least partially on the degrading at least a portion of the video/audio stream to a second resolution different than the first resolution if the at least one network condition is met.

2. A system related to data management, the system comprising:
   circuitry for accepting input for designating a video/audio data stream having a first resolution;
   circuitry for accepting input for degrading at least a portion of the video/audio data stream to a second resolution different than the first resolution if at least one network condition is met; and
   circuitry for transmitting at least one of the video/audio data stream at the first resolution or the portion of the video/audio data stream at the second resolution, the circuitry for transmitting the portion of the video/audio data stream at the first resolution or the video/audio data stream at the second resolution based at least partially on the circuitry for accepting input for degrading at least a portion of the video/audio stream to a second resolution different than the first resolution if the at least one network condition is met.

3. The system of claim 2, further comprising:
   circuitry for retaining a video/audio aspect of the video/audio data stream in at least one of the first resolution or the second resolution, the circuitry for retaining based at least partially on the circuitry for accepting input for degrading the at least a portion of the video/audio data stream to a second resolution different than the first resolution if the at least one network condition is met.

4. The system of claim 2, wherein the circuitry for accepting input for degrading at least a portion of the video/audio data stream to a second resolution different than the first resolution if at least one network condition is met comprises:
   circuitry for accepting input for degrading a residue of the video/audio data stream to a second resolution, wherein the residue is excluded from the video/audio data stream, and wherein the second resolution is less than the first resolution.

5. The system of claim 2, wherein the circuitry for accepting input for designating a video/audio data stream having a first resolution comprises:
   circuitry for accepting input for designating the video/audio data stream having a first resolution, wherein the designating the video/audio aspect of the video/audio data stream includes a designating of at least one instance of a distinct human voice and/or at least one instance of a distinct sound and/or at least one instance of an image of a distinct object.

6. The system of claim 2, wherein the circuitry for accepting input for designating a video/audio data stream having a first resolution comprises:
   circuitry for accepting input for designating the video/audio data stream having a first resolution, wherein the video/audio aspect of the video/audio data stream includes at least one particular video/imagery/audio aspect of interest, and
   wherein the transmitting at least one of the video/audio data stream at the first resolution or the portion of the video/audio data stream at the second resolution, the transmitting the portion of the video/audio data stream at the first resolution or the video/audio data stream at the second resolution based at least partially on the degrading at least a portion of the video/audio stream to a second resolution different than the first resolution if the at least one network condition is met includes at least:
      transmitting the at least one particular video/imagery/audio aspect of interest at the second resolution different than the first resolution.

7. The system of claim 2, wherein the circuitry for accepting input for designating a video/audio data stream having a first resolution comprises:
   circuitry for accepting input for designating the video/audio data stream having a first resolution, wherein the video/audio aspect of the video/audio data stream includes a portion of video/audio data included in a temporal segment of the video/audio data stream.

8. The system of claim 2, wherein the circuitry for transmitting at least one of the video/audio data stream at the first resolution or the portion of the video/audio data stream at the second resolution, the circuitry for transmitting the portion of the video/audio data stream at the first resolution or the video/audio data stream at the second resolution based at least partially on the circuitry for accepting input for degrading at least a portion of the video/audio stream to a second resolution different than the first resolution if the at least one network condition is met comprises:
   circuitry for transmitting at least one of the video/audio data stream at the first resolution or the portion of the video/audio data stream at the second resolution, wherein the video/audio data stream includes a plurality of temporal segments of the video/audio data stream, and wherein the plurality of temporal segments are available in at least one of the first resolution or the second resolution.

9. The system of claim 2, wherein the circuitry for accepting input for designating a video/audio data stream having a first resolution comprises:
   circuitry for accepting input for designating the video/audio data stream having a first resolution, wherein the video/audio data stream is a live and/or a substantially live video/audio data stream.

10. The system of claim 2, wherein the circuitry for accepting input for designating a video/audio data stream having a first resolution comprises:
    circuitry for accepting input for designating the video/audio data stream having a first resolution, wherein the video/audio data stream is a retained video/audio data stream.

11. The system of claim 2, further comprising:
    circuitry for accepting input for designating the second resolution value.

12. The system of claim 2, wherein the circuitry for accepting input for designating a video/audio data stream having a first resolution comprises:
    circuitry for accepting at least one of a tactile input, a sonic input, or a visual input.

13. The system of claim 2, further comprising:
    circuitry for accepting input for storing a residue of the video/audio data stream at the second resolution, wherein the residue is excluded from the video/audio aspect.

14. The system of claim 2, wherein the circuitry for accepting input for degrading the at least a portion of the video/audio data stream to a second resolution different than the first resolution if the at least one network condition is met comprises:
    circuitry for identifying at least one network associated with a device configured for displaying the video/audio data stream, and
    wherein the circuitry for transmitting at least one of the video/audio data stream at the first resolution or the portion of the video/audio data stream at the second resolution, the circuitry for transmitting the portion of the video/audio data stream at the first resolution or the video/audio data stream at the second resolution based at least partially on the circuitry for accepting input for degrading at least a portion of the video/audio stream to a second resolution different than the first resolution if the at least one network condition is met includes at least:
       circuitry for transmitting at least one of the video/audio data stream at the first resolution or the portion of the video/audio data stream at the second resolution, the circuitry for transmitting based at least partially on whether the network condition is met on the identified at least one network associated with the device configured for displaying the video/audio data stream.

15. The system of claim 2, wherein the circuitry for transmitting at least one of the video/audio data stream at the first resolution or the portion of the video/audio data stream at the second resolution, the circuitry for transmitting the portion of the video/audio data stream at the first resolution or the video/audio data stream at the second resolution based at least partially on the circuitry for accepting input for degrading at least a portion of the video/audio stream to a second resolution different than the first resolution if the at least one network condition is met comprises:
    circuitry for transmitting at least one temporal segment of the video/audio data stream at the first resolution or the second resolution; and circuitry for transmitting at least one sequential temporal segment of the video/audio data stream at the first resolution or the second resolution based at least partially on whether the condition is met.

16. The system of claim 2, further comprising:
circuitry for monitoring at least one network associated with at least one video/audio data device, and
wherein the circuitry for accepting input for degrading at least a portion of the video/audio data stream to a second resolution different than the first resolution if at least one network condition is met includes at least:
circuitry for accepting input for degrading at least a portion of the video/audio data stream if the circuitry for monitoring the at least one network associated with the at least one video/audio data device detects that the at least one network condition is met.

17. The system of claim 2, wherein the circuitry for accepting input for degrading at least a portion of the video/audio data stream to a second resolution different than the first resolution if at least one network condition is met comprises:
circuitry configured for modifying at least one of the bit rate, frequency range characteristics, or frequency distribution characteristics of the at least a portion of the video/audio data stream to the second resolution different than the first resolution if the at least one network condition is met.

18. A program product related to data management, the program product comprising:
a non-transitory signal bearing medium bearing at least:
one or more instructions for accepting input for designating a video/audio data stream having a first resolution;
one or more instructions for accepting input for degrading at least a portion of the video/audio data stream to a second resolution different than the first resolution if at least one network condition is met; and
one or more instructions for transmitting at least one of the video/audio data stream at the first resolution or the portion of the video/audio data stream at the second resolution, the transmitting the portion of the video/audio data stream at the first resolution or the video/audio data stream at the second resolution based at least partially on the degrading at least a portion of the video/audio stream to a second resolution different than the first resolution if the at least one network condition is met.

19. The program product of claim 18, wherein the non-transitory computer-readable medium comprises:
a recordable medium.

20. The program product of claim 18, wherein the non-transitory computer-readable medium comprises:
a transmission medium.

* * * * *